US008424101B2

(12) United States Patent
Takashima

(10) Patent No.: US 8,424,101 B2
(45) Date of Patent: Apr. 16, 2013

(54) INFORMATION PROCESSING APPARATUS AND METHOD, INFORMATION RECORDING MEDIUM MANUFACTURING APPARATUS AND METHOD, AND INFORMATION RECORDING MEDIUM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1049 days.

(21) Appl. No.: 11/601,432

(22) Filed: Nov. 16, 2006

(65) Prior Publication Data

US 2007/0116280 A1 May 24, 2007

(30) Foreign Application Priority Data

Nov. 21, 2005 (JP) .................................. 2005-336226

(51) Int. Cl.
G06F 21/00 (2006.01)
(52) U.S. Cl.
USPC ........................................................... 726/27
(58) Field of Classification Search ..................... 726/26
See application file for complete search history.

(56) References Cited

U.S. PATENT DOCUMENTS

| | | | | |
|---|---|---|---|---|
| 5,991,399 A * | 11/1999 | Graunke et al. | ............. | 380/279 |
| 6,671,803 B1 * | 12/2003 | Pasieka | .......................... | 713/156 |
| 7,225,333 B2 * | 5/2007 | Peinado et al. | ............... | 713/164 |
| 7,536,420 B2 | 5/2009 | Takashima | | |
| 2002/0118838 A1 * | 8/2002 | Belenko et al. | ............... | 380/277 |
| 2002/0157002 A1 * | 10/2002 | Messerges et al. | ........... | 713/155 |
| 2003/0191963 A1 * | 10/2003 | Balissat et al. | ................ | 713/201 |
| 2003/0217011 A1 * | 11/2003 | Peinado et al. | ................. | 705/59 |
| 2004/0003238 A1 * | 1/2004 | Mak et al. | ...................... | 713/156 |
| 2004/0064701 A1 * | 4/2004 | O'Donoghue | ................. | 713/175 |
| 2004/0172533 A1 * | 9/2004 | DeMello et al. | .............. | 713/164 |
| 2005/0044227 A1 * | 2/2005 | Haugh et al. | .................. | 709/226 |
| 2005/0091521 A1 * | 4/2005 | Terada et al. | ................. | 713/194 |
| 2005/0132209 A1 * | 6/2005 | Hug et al. | ...................... | 713/189 |
| 2006/0064756 A1 * | 3/2006 | Ebert | .............................. | 726/26 |
| 2006/0168357 A1 * | 7/2006 | Nakano et al. | ..................... | 710/5 |
| 2006/0288424 A1 * | 12/2006 | Saito | ............................... | 726/26 |
| 2008/0037781 A1 | 2/2008 | Kocher et al. | | |
| 2008/0310267 A1 | 12/2008 | Hattori et al. | | |
| 2009/0204825 A1 | 8/2009 | Takashima | | |

FOREIGN PATENT DOCUMENTS

| | | |
|---|---|---|
| JP | 2002-311998 A | 10/2002 |
| JP | 2003-323351 A | 11/2003 |
| JP | 2003-330560 A | 11/2003 |
| JP | 2004-272341 A | 9/2004 |
| JP | 2004-303107 A | 10/2004 |
| JP | 2004-532495 A | 10/2004 |
| WO | WO 2005/008385 A2 | 1/2005 |

* cited by examiner

Primary Examiner — Gilberto Barron, Jr.
Assistant Examiner — David Le
(74) Attorney, Agent, or Firm — Wolf, Greenfield & Sacks, P.C.

(57) ABSTRACT

An information processing apparatus includes a data processor that obtains a security check code included in content codes recorded on an information recording medium when using content and that conducts security check for the information processing apparatus in accordance with the obtained security check code. The data processor obtains information based on at least one of identification information and configuration information corresponding to the information processing apparatus or a content usage application, and among security check codes classified into a plurality of data files, the data processor selects a security check code corresponding to the obtained information to conduct security check on the basis of the selected security check code.

22 Claims, 16 Drawing Sheets

FIG. 11

| FIELD |
|---|
| PLAYER CERTIFICATE SIZE |
| CERTIFICATE VERSION |
| MANUFACTURER ID |
| SERIAL NUMBER |
| SIGNATURE TIME AND DATE |
| DEVICE (PLAYER) ATTRIBUTE INFORMATION |
| PLAYER PUBLIC KEY |
| SIGNATURE |

FIG. 12

| FIELD | |
|---|---|
| | PORT ATTRIBUTES: ONE-WAY, TWO-WAY, ANALOG, DIGITAL, VIDEO, AUDIO, RECORDABLE/NOT-RECORDABL |
| | PORT STATUSES: OUTPUT FORMAT (COMPOSITE VIDEO, COMPONENT VIDEO, DIGITAL AUDIO, DIGITAL VIDEO) AND PROTOCOL INFORMATION (SUCH AS VGA/HDCP/DTCP) |
| | PLAYER INFORMATION: RAM SIZE, SYSTEM CLOCK, AND MEDIA TRANSFORM PROCESSING METHOD FOR VM |
| | .. |

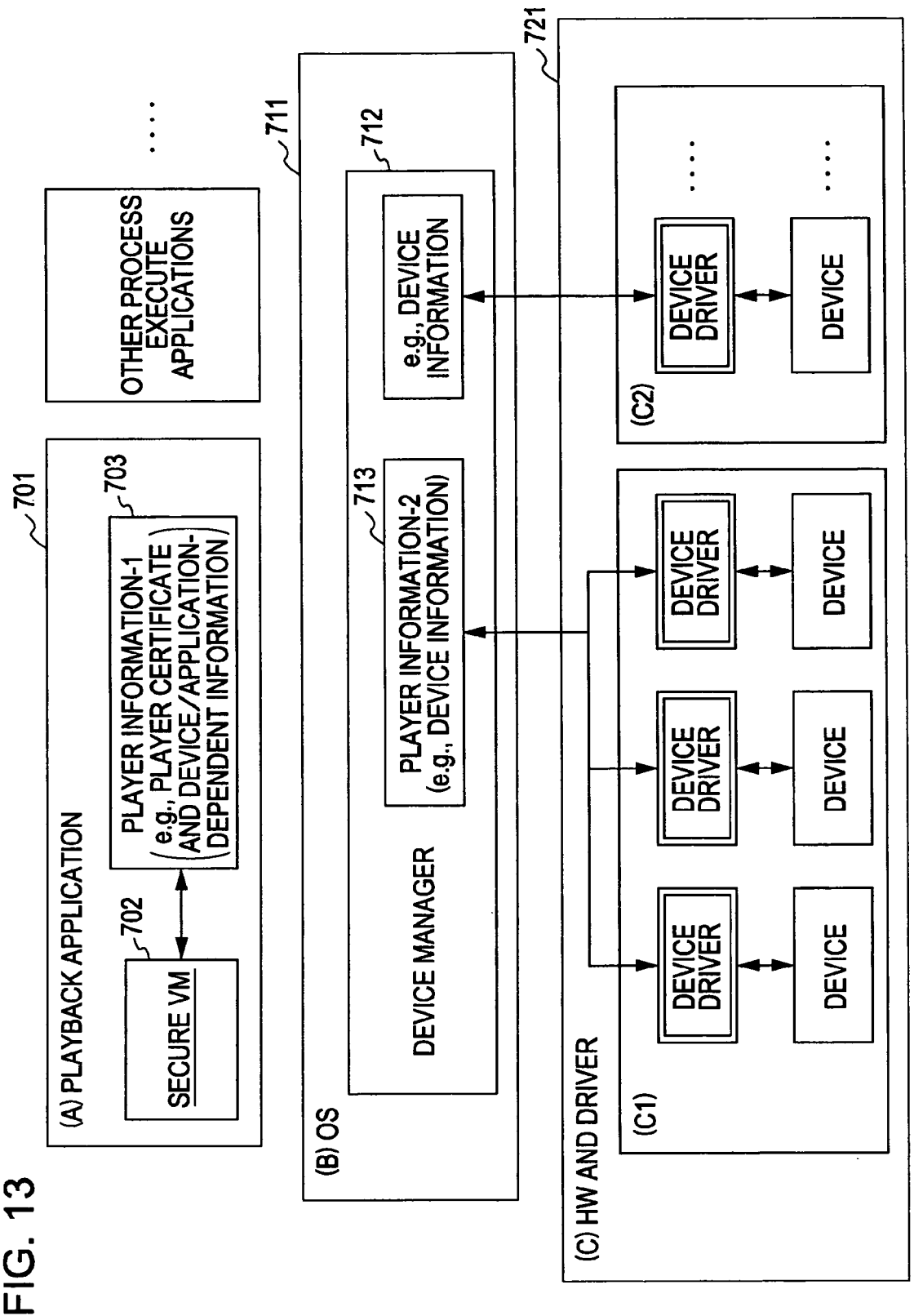

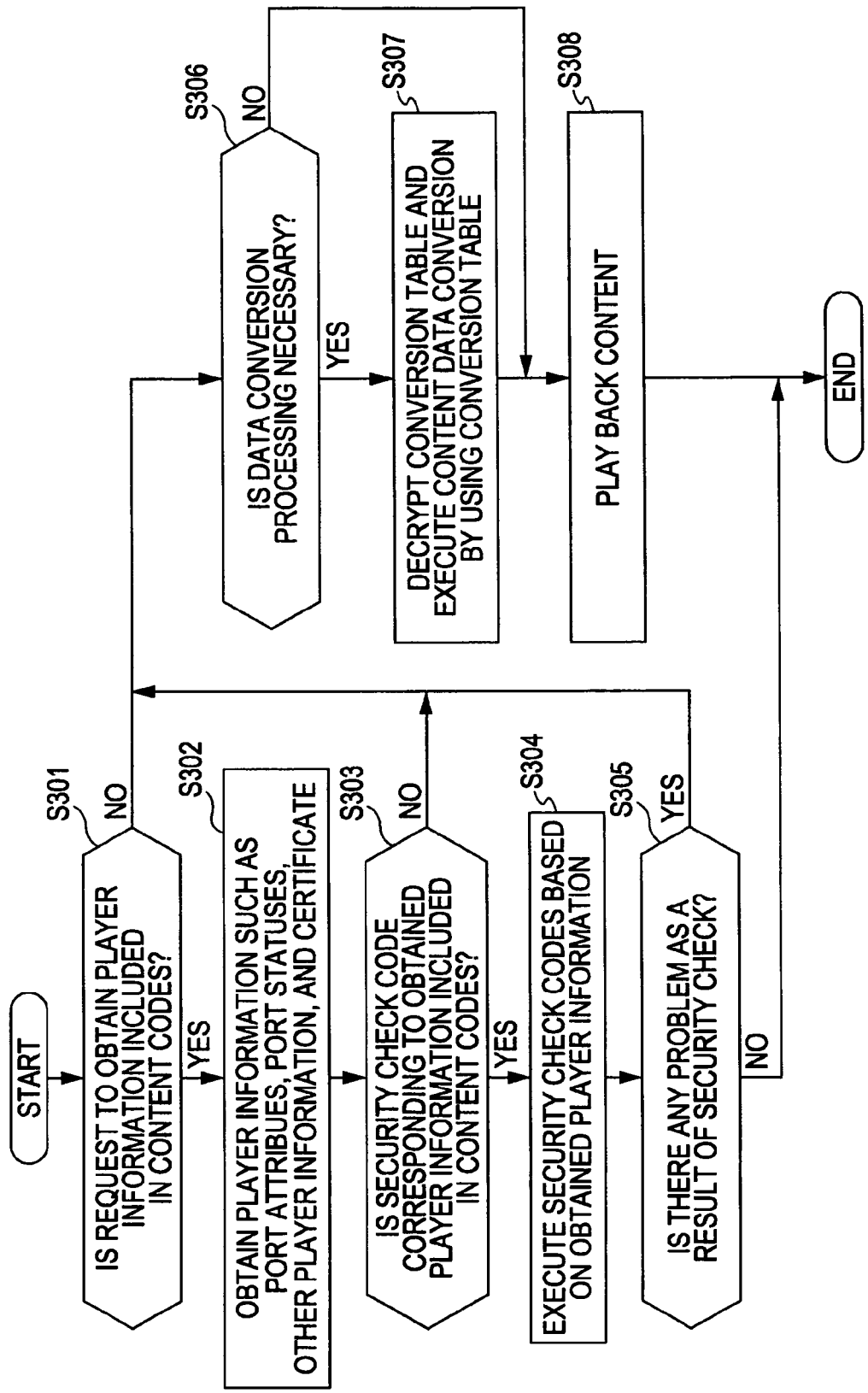

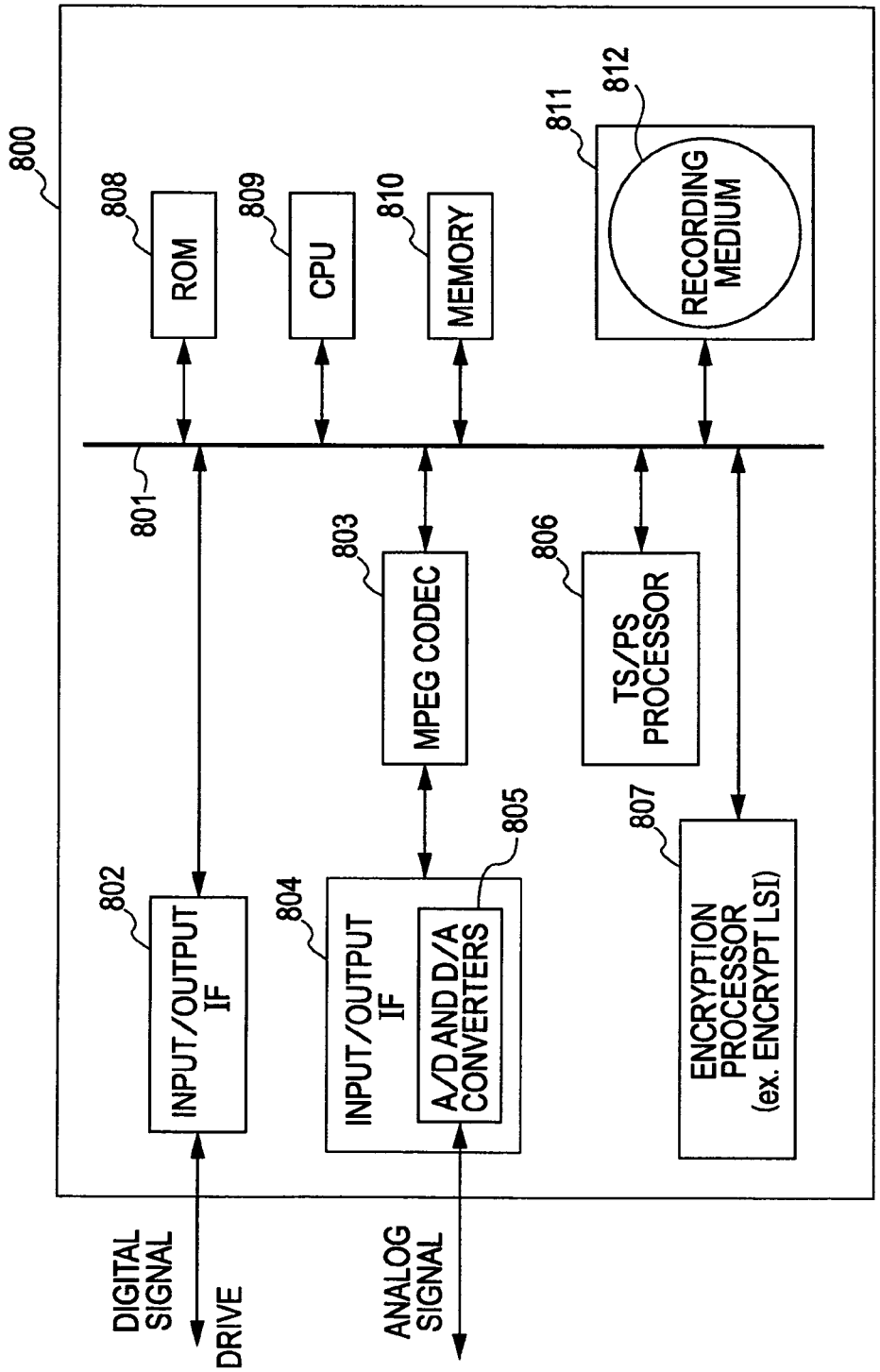

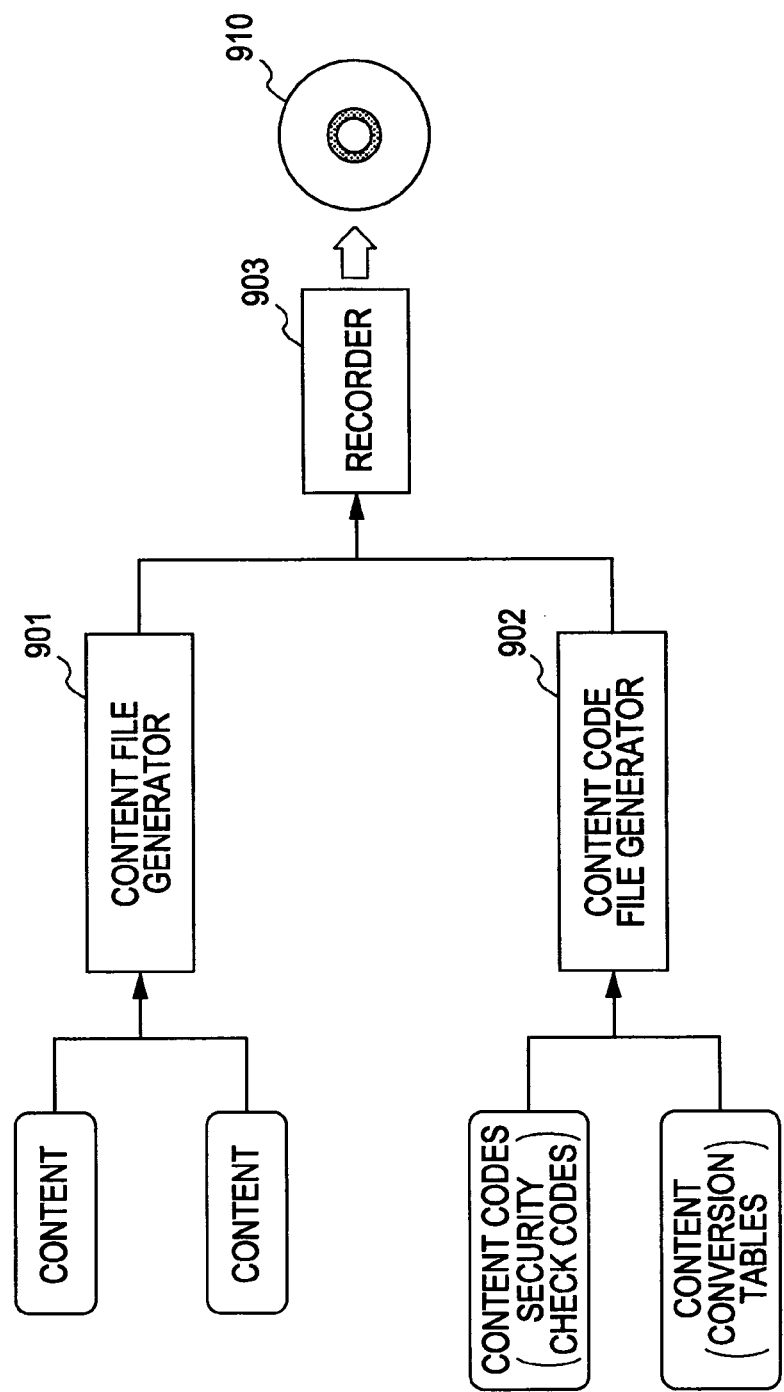

INFORMATION PROCESSING APPARATUS AND METHOD, INFORMATION RECORDING MEDIUM MANUFACTURING APPARATUS AND METHOD, AND INFORMATION RECORDING MEDIUM

CROSS REFERENCES TO RELATED APPLICATIONS

The present invention contains subject matter related to Japanese Patent Application JP 2005-336226 filed in the Japanese Patent Office on Nov. 21, 2005, the entire contents of which are incorporated herein by reference.

BACKGROUND OF THE INVENTION

1. Field of the Invention

The present invention relates to information processing apparatuses and methods, information recording medium manufacturing apparatuses and methods, and information recording media. More particularly, the invention relates to an information processing apparatus and method, an information recording medium manufacturing apparatus and method, and an information recording medium that allow the execution of security check processing by using content codes recorded, as a content usage control program, on the information recording medium together with content.

2. Description of the Related Art

Various software data (hereinafter referred to as "content"), such as audio data, e.g., music, image data, e.g., movies, game programs, and various application programs, can be stored on recording media, for example, Blu-ray discs (trademark) using blue laser light, digital versatile discs (DVDs), mini discs (MDs), compact discs (CDs), as digital data. In particular, Blu-ray discs (trademark) using blue laser light are high-density recording discs and can record a large volume of video content as high-quality image data.

Digital content is stored in various information recording media, such as those described above, and is provided to users. A user uses the digital content by playing it back on the user's personal computer (PC) or a player, such as a disc player.

Generally, the distribution rights of many content data, such as music data and image data, are owned by creators or sellers of such content data. Basically, therefore, certain usage restrictions are imposed when distributing content, that is, the use of content is allowed only for authorized users, thereby preventing unauthorized copying.

According to digital recording apparatuses and recording media, images and sound can be repeatedly recorded and played back without a loss in quality. Thus, the distribution of illegally copied content via the Internet, the circulation of recording media, such as compact disc recordable (CD-R) discs, recording copied content thereon, so-called "pirated discs", and the use of copied content stored in hard disks of, for example, PCs, are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

One of the measures to enhance copyright protection is to encrypt content. According to this measure, however, if leakage of cryptographic keys used for encrypting content occurs, it is difficult to prevent unauthorized copying of content and distribution of such copied content. One measure to solve such a problem is the configuration disclosed in Japanese Unexamined Patent Application Publication No. 2002-311998. In this configuration, content is recorded in the state in which part of content data is substituted by dummy data so that unauthorized playback of the content can be prevented.

When playing back content including dummy data, it is necessary to replace the dummy data by correct content data. This data conversion processing should be performed while preventing leakage of the correct content data, and certain measures are also preferably taken to prevent leakage of processing information, such as the location of dummy data and the conversion method.

As discussed above, when playing back content, it is necessary to execute content decryption processing and data conversion processing, and in some cases, security check, such as integrity checking processing to determine whether an information processing apparatus or a playback (player) program that is to use content is an authorized apparatus or program having a license, is conducted. Such data processing is performed by executing content codes recorded, as a content usage control program, on an information recording medium together with content. An example of content usage processing using content codes is disclosed in, for example, WO2005/008385.

Content codes are set as a file independent of content and are recorded on an information recording medium. Accordingly, it is possible that only content codes be moved or copied onto another information recording medium. If leakage of content codes occurs, which may lead to unauthorized distribution and usage of the content, it is likely that many items of content are illegally played back and used, causing enormous damage.

It can be assumed that various types of apparatuses or applications manufactured by different manufacturers be used for playing back content. If security check using content codes is performed according to only one common sequence, it is difficult to perform sufficient checking depending on the types of apparatuses or application. Additionally, a file for performing security check for each playback apparatus is probably used regardless of type of content, and thus, it is desirable that the file be reused.

SUMMARY OF THE INVENTION

It is thus desirable to provide an information processing apparatus and method, an information recording medium manufacturing apparatus and method, and an information recording medium in which a strict management structure for content codes recorded, as a content usage control program, on an information recording medium together with content can be implemented while allowing the reuse of security check codes included in the content codes, and when verifying players by using the security check codes, optimal security check in accordance with the types of players can be conducted.

According to an embodiment of the present invention, there is provided an information processing apparatus that performs playback processing for content recorded on an information recording medium. The information processing apparatus includes a data processor operable to obtain a security check code included in content codes recorded on the information recording medium when using the content and to conduct security check for the information processing apparatus in accordance with the obtained security check code. The data processor obtains information based on at least one of identification information and configuration information corresponding to the information processing apparatus or a content usage application, and among security check codes classified into a plurality of data files, the data processor selects a security check code corresponding to the obtained information to conduct security check on the basis of the selected security check code.

The data processor may obtain a player certificate stored in a storage unit of the information processing apparatus to verify the integrity of the player certificate, and under the condition that the integrity of the player certificate is verified, the data processor may obtain at least one of the identification information and the configuration information corresponding to the information processing apparatus or the content usage application from information recorded on the player certificate.

The data processor may obtain the information based on, as the configuration information, at least one of port attribute information, port status information, memory area size information, and data processing mode information concerning the information processing apparatus, and conducts security check corresponding to the obtained information.

When obtaining the configuration information, the data processor may obtain device information managed by an operating system (OS) and conducts security check corresponding to the obtained information.

When the configuration information is updated, the data processor may obtain the updated configuration information and conducts security check corresponding to the updated configuration information.

The data processor may perform data processing which accompanies content data replacement processing using a conversion table included in the content codes, the data processing being performed in accordance with a selected code corresponding to the information obtained based on at least one of the identification information and the configuration information corresponding to the information processing apparatus or the content usage application.

According to another embodiment of the present invention, there is provided an information recording medium manufacturing apparatus including content file obtaining means for obtaining content files storing content data to be recorded on an information recording medium, content code file obtaining means for obtaining content code files storing content codes including a security check processing program to be executed when content is used, and recording means for recording the content files obtained by the content file obtaining means and the content code files obtained by the content code file obtaining means on the information recording medium. The content code file obtaining means obtains a plurality of content code files corresponding to types of information processing apparatuses or content usage applications.

The content code file obtaining means may obtain content code files storing common content codes that do not depend on the types of information processing apparatuses or content usage applications and content code files storing content codes that depend on the types of information processing apparatuses or content usage applications.

The content code file obtaining means may obtain a code file storing a code for determining the type of information processing apparatus or content usage application.

According to another embodiment of the present invention, there is provided an information recording medium including content files storing content data and content code files storing content codes including a security check processing program to be executed when content is used. The content code files include a plurality of content code files corresponding to types of information processing apparatuses and content usage applications.

The content code files may include content code files storing common content codes that do not depend on the types of information processing apparatuses or content usage applications and content code files storing content codes that depend on the types of information processing apparatuses or content usage applications.

The content code files may include a code file storing a code for determining the type of information processing apparatus or content usage application.

According to another embodiment of the present invention, there is provided an information processing method, for use in an information processing apparatus, for performing data processing using data recorded on an information recording medium. The information processing method includes the steps of performing data processing by obtaining a security check code included in content codes recorded on the information recording medium when using content recorded on the information recording medium and by conducting security check for the information processing apparatus in accordance with the obtained security check code. In the execution of the data processing, information based on at least one of identification information and configuration information corresponding to the information processing apparatus or a content usage application is obtained, and among security check codes classified into a plurality of data files, a security check code corresponding to the obtained information is selected, and security check is conducted on the basis of the selected security check code.

In the execution of the data processing, a player certificate stored in a storage unit of the information processing apparatus may be obtained to verify the integrity of the player certificate, and under the condition that the integrity of the player certificate is verified, at least one of the identification information and the configuration information corresponding to the information processing apparatus or the content usage application may be obtained from information recorded on the player certificate.

In the execution of the data processing, at least one of port attribute information, port status information, memory area size information, and data processing mode information concerning the information processing apparatus may be obtained as the configuration information, and security check corresponding to the obtained information is conducted.

In the execution of the data processing, device information managed by an OS may be obtained when obtaining the configuration information, and security check corresponding to the obtained information is conducted.

In the execution of the data processing, when the configuration information is updated, the updated configuration information may be obtained, and security check corresponding to the updated configuration information is conducted.

In the execution of the data processing, data processing which accompanies content data replacement processing using a conversion table included in the content codes may be performed, the data processing being performed in accordance with a selected code corresponding to the information obtained based on at least one of the identification information and the configuration information corresponding to the information processing apparatus or the content usage application.

According to another embodiment of the present invention, there is provided an information recording medium manufacturing method for use in an information recording medium manufacturing apparatus. The information recording medium manufacturing method includes the steps of obtaining content files storing content data to be recorded on an information recording medium, obtaining content code files storing content codes including a security check processing program to be executed when content is used, and recording the obtained content files and the obtained content code files on the information recording medium. In the execution of obtaining the content code files, a plurality of content code files corresponding to types of information processing apparatuses or content usage applications are obtained.

In the execution of obtaining the content code files, content code files storing common content codes that do not depend on the types of information processing apparatuses or content usage applications and content code files storing content codes that depend on the types of information processing apparatuses or content usage applications may be obtained.

In the execution of obtaining the content code files, a code file storing a code for determining the type of information processing apparatus or content usage application may be obtained.

According to an embodiment of the present invention, a security check code included in content codes recorded on an information recording medium is obtained when using the content, and security check for an information processing apparatus is conducted in accordance with the obtained security check code. Information based on at least one of identification information and configuration information corresponding to the information processing apparatus or a content usage application is obtained, and a security check code corresponding to the obtained information is selected, and security check is conducted on the basis of the selected security check code. Accordingly, optimal security check in accordance with various types and versions of apparatuses or various playback applications can be conducted, thereby effectively preventing unauthorized use of content. Additionally, the reuse of security codes can be implemented, thereby achieving efficient manufacturing of information recording media.

Further features and advantages of the present invention will become apparent from the following description of exemplary embodiments with reference to the attached drawings.

BRIEF DESCRIPTION OF THE DRAWINGS

FIG. 11 illustrates an example of the data structure of a player certificate;

FIG. 12 illustrates player information other than a player certificate;

FIG. 13 illustrates an example of processing for obtaining player information;

FIG. 14 is a flowchart illustrating a content playback sequence performed by an information processing apparatus;

FIG. 15 illustrates an example of the hardware configuration of an information processing apparatus; and FIG. 16 is a block diagram illustrating the configuration of an information recording medium manufacturing apparatus.

DESCRIPTION OF THE PREFERRED EMBODIMENTS

Details of an information processing apparatus and method, an information recording medium manufacturing apparatus and method, and an information recording medium according to an embodiment of the present invention are described below with reference to the accompanying drawings. A description thereof is given in the following order.

Figure 1:
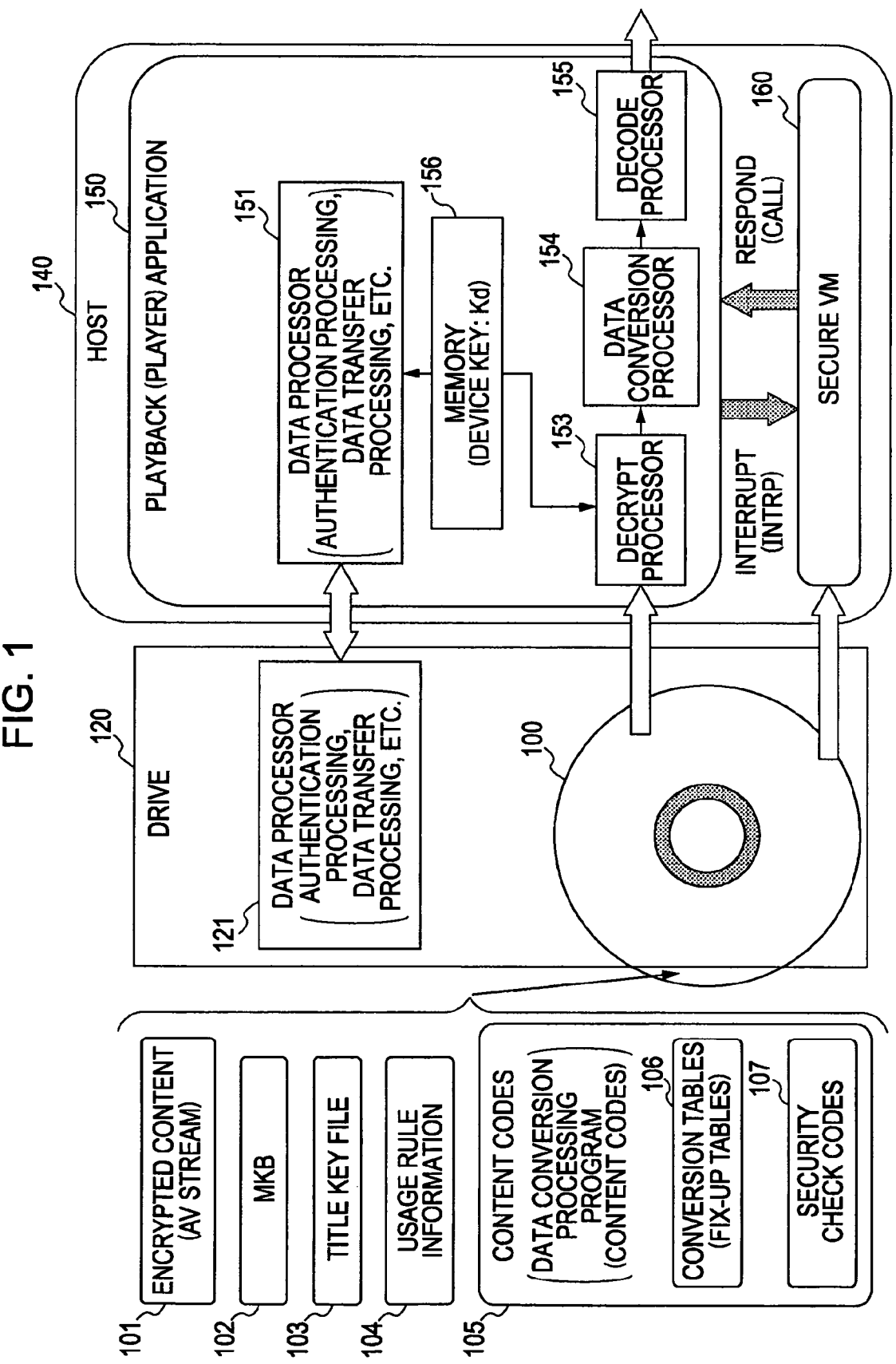
FIG. 1 illustrates storage data in an information recording medium and the configuration and processing of a drive and an information processing apparatus.

1. Overview of Storage Data in Information Recording Medium and Processing Performed by Drive and Host
2. Content Management Units (CPS Units)
3. Overview of Structure of Content Data Including Modified Data and Data Conversion Processing
4. Content Playback Processing
5. Processing Using Security Check Codes
6. Configuration of Information Processing Apparatus
7. Information Recording Medium Manufacturing Apparatus and Information Recording Medium 1. Overview of Storage Data in Information Recording Medium and Processing Performed by Drive and Host An overview of storage data in an information recording medium and processing performed by a drive and a host is first described. FIG. 1 illustrates the configurations of an information recording medium 100 in which content is stored, a drive 120, and a host 140. The host 140 is a data playback (or recording) application executed by an information processing apparatus, for example, a PC, and executes processing by using hardware of an information processing apparatus, for example, a PC, in accordance with a predetermined data processing sequence.

The information recording medium 100 is an information recording medium (e.g., a read only memory (ROM) disk), or a data rewritable information recording medium (e.g., an RE disk), such as a Blu-ray disc (trademark) or a DVD, storing authorized content, manufactured in a disc manufacturing factory with the permission of a so-called "content right holder" having an authorized content copyright or distribution right. In the following embodiment, as the information recording medium, a disc medium is used. In the present invention, however, various forms of information recording media can be used.

The information recording medium 100 stores, as shown in FIG. 1, encrypted content 101 subjected to encrypt processing and replacement (overwriting) processing, i.e., in which part of data is overwritten by another data, a media key block (MKB) 102, which serves as a cryptographic key block, generated based on a tree-structure key distribution system, which is known as one mode of a broadcast encryption system, a title key file 103 including an encrypted title key (encrypted content protection system (CPS) unit key) used for content decryption processing, usage rule information 104 including copy control information (CCI) as content copy/playback control information, and content codes 105 including a data conversion processing program executed when using the encrypted content 101.

The content codes 105 include conversion tables (fix-up tables) 106 storing conversion data corresponding to data to be replaced in predetermined areas of content, and also include security check codes 107, such as a program for verifying the integrity of a player (playback apparatus) that performs content playback.

When playing back content, the information processing apparatus verifies, for example, the integrity of the player in accordance with the security check codes 107 included in the content codes 105, and then extracts conversion data stored in the conversion table (fix-up table) 106 included in the content codes 105 in accordance with the data conversion processing program contained in the content codes 105 to replace part of data forming the content.

The conversion tables 106 and the security check codes 107 include conversion tables and various types of codes so that processing, i.e., security check and conversion processing, can be performed in accordance with the types of players and player port information. For example, the conversion tables 106 and the security check codes 107 include a conversion table and a security check code corresponding to players manufactured by company A and a conversion table and a security check code corresponding to players manufactured by company B. To use content, a player selects the security check code and the conversion table corresponding to that player and executes processing.

The content codes 105 include, not only the data conversion processing program, but also information and programs for executing various other types of processing, such as startup processing and security check processing. Details of the content codes 105 are given below. The storage data in the information recording medium 100 shown in FIG. 1 are examples only, and different storage data can be stored depending on the type of disc. An overview of various items of information is discussed below.

Encrypted Content

In the information recording medium 100, various items of content data, such as audiovisual (AV) streams of moving picture content, for example, high definition (HD) movie content, game programs, image files, sound data, and text data, defined by specific standards, are stored. Those items of content are specific AV format standard data, which are stored according to specific AV data formats. More specifically, for example, content is stored as the Blu-ray disc (trademark) ROM standard data according to the Blu-ray ROM standard format.

Game programs, image files, sound data, or text data, which serve as service data, may be stored. Those items of content may be stored as data having a data format which is not compliant with a specific AV data format.

As the types of content, various content, such as music data, image data, for example, moving pictures and still images, game programs, and WEB content, are included. Such content includes various modes of information, such as content information that can be used only by data from the information recording medium 100, and content information that can be used by a combination of the data from the information recording medium 100 and data provided from a server connected to the recording medium 100 via a network. To individually control the use of each segment of content, the content is stored in the information recording medium 100 by assigning different keys (CPS unit keys or unit keys, which are also referred to as "title keys") to segments and by encrypting each segment with a key, which is different from those for the other segments. The unit to which one unit key is assigned is referred to as a "content management unit (CPS unit)". In the content, part of the data is set as broken data by being replaced by data different from correct data, and thus, even if the content is decrypted, it cannot be correctly played back. To correctly play back the content, it is necessary to replace broken data by correct data registered in the conversion table. Such replacement processing is described in detail below.

MKB

The MKB 102 is a cryptographic key block generated based on a tree-structure key distribution system, which is known as one mode of the broadcast encryption method. The MKB 102 is a key information block that makes it possible to obtain a media key (Km), which is a key necessary for decrypting content, only by processing (decryption) by using a device key (Kd) stored in information processing apparatuses having valid licenses. The MKB 102 is based on an information distribution system according to a so-called hierarchical tree structure. The MKB 102 makes it possible to obtain the media key (Km) only when a user device (information processing apparatus) has a valid license, and to disable revoked user devices from obtaining the media key (Km).

By changing the device key used for encrypting key information stored in the MKB 102, a management center, which serves as a license entity, allows the MKB 102 to disable a device key stored in a specific user device from decrypting content, that is, makes the user device unable to obtain the media key necessary for decrypting the content. It is thus possible to provide encrypted content only to devices having valid licenses while revoking unauthorized devices at a suitable time. Content decrypt processing is discussed below.

Title Key File

As stated above, in each content or a set of a plurality of items of content, content segments are encrypted with individual cryptographic keys (title keys or CPS unit keys) and are then stored in the information recording medium 100. That is, it is necessary to divide AV streams, music data, image data, such as moving pictures and still images, game programs, and WEB content, into units, which are management units for using content, and to generate different title keys for the divided units and to decrypt the content units with the generated different title keys. Information for generating the title keys is title key data, and title keys can be obtained by decrypting encrypted title keys with keys generated by using, for example, media keys. Title keys for the corresponding units are generated in accordance with a predetermined cryptographic key generation sequence using the title key data so that the content units can be decrypted.

Usage Rule Information

Usage rule information includes, for example, copy/playback control information (CCI), that is, copy restriction information or playback restriction information used for controlling the use of the encrypted content 101 stored in the information recording medium 100. The copy/playback control information (CCI) may be set in various manners, such as being set for each CPS unit, which serves as the content management unit, or for a plurality of CPS units.

Content Codes

As stated above, the content codes 105 include the conversion tables (fix-up tables) 106 in which conversion data corresponding to data to be replaced in predetermined areas of content is registered and the security check codes 107, such as a program for verifying the integrity of players (playback apparatuses) that perform content playback.

As discussed above, the conversion tables 106 and the security check codes 107 include various codes so that processing can be performed in accordance with the types of various players and player port information. To use content, a player selects the security check code and the conversion table corresponding to that player and executes security check processing and data conversion processing, respectively.

The host 140, which serves as the playback application 150 of a player to play back content, sets a virtual machine (VM) that executes data conversion processing, and executes security check processing and data conversion processing in accordance with the content codes read from the information recording medium 100 by using the VM to convert part of the data forming the content by using the entries registered in the conversion tables 106.

The encrypted content 101 stored in the information recording medium 100 has been subjected to certain encryption processing, and part of the data forming the content 101 is broken data different from correct data. When playing back the encrypted content 101, it is necessary to replace (overwrite) a plurality of broken data by conversion data registered in the conversion tables 106. Many broken data are dispersedly set in the encrypted content 101, and to play back the content 101, it is necessary to replace (overwrite) the plurality of broken data by the conversion data registered in the conversion tables 106. Because of the existence of broken data, even if leakage of cryptographic keys occurs and the unauthorized decryption of content is performed, the content cannot be played back correctly. As a result, unauthorized use of the content can be prevented.

The conversion tables 106 include, not only normal conversion data, but also specific conversion data that enables the analysis of bits forming identification information for identifying a content player or a content playback application. More specifically, the specific conversion data includes identification marks on which player IDs as the identification data for players (devices that execute host applications) or identification information generated based on the player IDs are recorded. The specific conversion data including identification marks are generated by slightly modifying the bits forming the correct content data to such a degree as not to influence playback of the content.

The content codes 105 include, not only the data conversion processing program executed by using the conversion tables 106, but also information and programs for executing other types of processing, such as startup processing and security processing. Details of content codes 105 are described below.

An overview of the configurations of the host 140 and the drive 120 and processing performed by thereof is discussed below with reference to FIG. 1. Content stored in the information recording medium 100 is played back by transferring data concerning the content to the host 140 via the drive 120.

In the host 140, the playback (player) application 150 and a secure VM 160 are set. The playback application 150 is a content playback processor, and executes processing, such as authentication with the drive 120, content decryption, and decoding.

The secure VM 160 executes processing by using the content codes 105 including the conversion tables 106 and the security check codes 107. The secure VM 160 selects the security check code 107 corresponding to the associated player from the security check codes 105 to perform security check processing, and also performs replacement processing for replacing part of the data forming the content by using the conversion tables 106. The secure VM 160 is set as a virtual machine in the host 140. The virtual machine (VM), which is a virtual computer that directly analyzes an intermediate language and executes it, reads instruction code information of a platform-independent intermediate language, from the information recording medium 100, and analyzes the instruction code information to execute it.

The secure VM 160, which serves as a data processor that obtains the content codes 105 containing a program or information for using the encrypted content 101 recorded on the information recording medium 100 and that executes the content codes 105 to perform data processing.

Communication between the playback application 150 and the secure VM 160, such as sending and receiving information and processing requests, is performed by a sequence of interrupt (INTRP) from the playback application 150 to the secure VM 160 and response (call) from the secure VM 160 to the playback application 150.

Major processing executed by the host 140 is as follows. Before the use of content, mutual authentication processing between the drive 120 and the host 140 is conducted. After verifying the integrity of the drive 120 and the host 140 as a result of mutual authentication processing, the encrypted content 101 is transferred from the drive 120 to the host 140, and the host 140 decrypts the encrypted content 101 and also executes data conversion processing by using the conversion tables 106 to play back the content.

A data processor 121 of the drive 120 conducts authentication with the host 140 to use the content, and reads the data from the information recording medium 100 and transfers it to the host 140.

The playback (player) application 150 of the host 140, which is a data playback (or recording) application executed by an information processing apparatus, for example, a PC, executes processing by using hardware of the information processing apparatus in accordance with a predetermined data processing sequence.

The host 140 includes a data processor 151 that executes mutual authentication with the drive 120 and data transfer control, a decrypt processor 153 that decrypts the encrypted content 101, a data conversion processor 154 that performs data conversion processing on the basis of the data registered in the conversion tables 106, and a decode processor 155 that performs decoding (for example, MPEG decoding).

The decrypt processor 153 generates a key used for decrypting the encrypted content 101 by using various information stored in a memory 156 and the data read from the information recording medium 100 to decrypt the encrypted content 101. The data conversion processor 154 executes replacement (overwrite) processing for replacing (overwriting) part of the data forming the content by using the conversion data registered in the conversion tables 106 in accordance with the data conversion processing program obtained from the information recording medium 100. The decode processor 155 executes decoding (for example, MPEG decoding) processing.

In the memory 156, a device key (Kd) and key information used for mutual authentication and decryption are stored. The device key (Kd) is a key used for the above-described MKB processing. The MKB 102 is a key information block that makes it possible to obtain a media key (Km), which is a key necessary for decrypting content, only by processing (decryption) by using the device key (Kd) stored in information processing apparatuses having valid licenses. To decrypt the encrypted content 101, the playback application 150 (information processing apparatus) executes the MKB processing by using the device key (Kd) stored in the memory 156. Details of content decryption processing are given below.

2. Content Management Units (CPS units)

As stated above, to control the use of content based on different content units, content stored in an information recording medium is encrypted and stored by assigning different keys to content units. That is, the content is segmented into content management units (CPS units), and the CPS units are individually encrypted and usage control is performed for the individual CPS units.

To use content, it is necessary to first obtain a CPS unit key (also referred to as a "title key") assigned to each unit, and then, by using the CPS unit key and other necessary keys and key generation information, data processing based on a predetermined decrypt processing sequence is executed to play back content. An example of the setting of content management units (CPS units) is discussed below with reference to FIG. 2.

Figure 2:
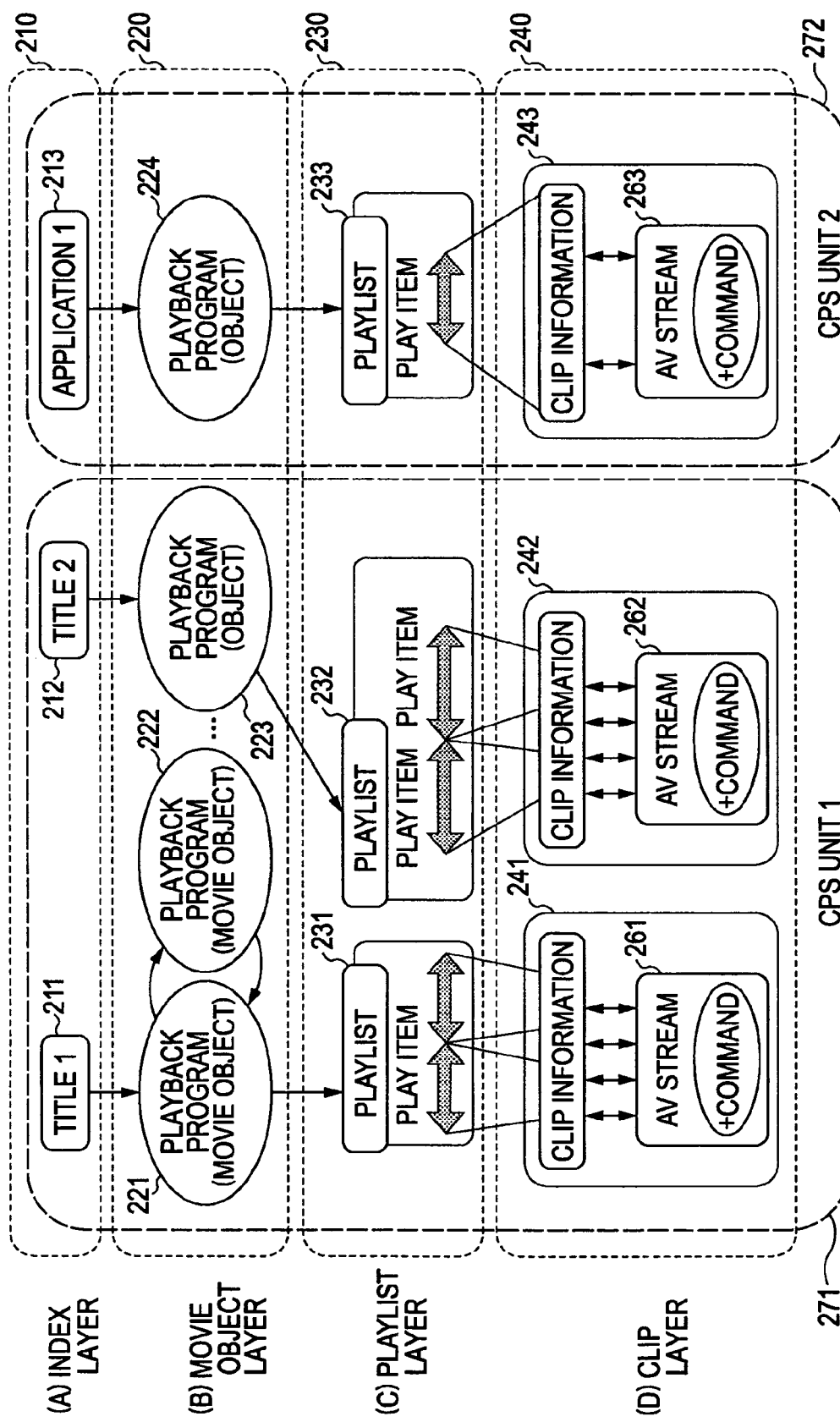
FIG. 2 illustrates content management units set in storage content in an information recording medium.

Content has, as shown in FIG. 2, a hierarchical structure including (A) an index layer 210, (B) a movie object layer 220, (C) a playlist layer 230, and (D) a clip layer 240. When designating an index, such as a title, accessed by a playback application, a playback program associated with the title is designated, and a playlist defining, for example, a content playback order, is selected according to program information concerning the designated playback program.

A playlist includes one or more play items as information concerning zones to be played back. According to clip information as a playback zone defined by the play items, AV streams or commands as real content data are selectively read to play back the AV streams or to execute the commands. There are a plurality of playlists or a plurality of play items, and playlist IDs or play item IDs are associated with the playlists or play items as identification information.

FIG. 2 shows two CPS units, which form part of content stored in an information recording medium. Each of a CPS unit-1 271 and a CPS unit-2 272 includes a title as an index, a movie object as a playback program file, a playlist, and an AV stream file as real content data.

The content management unit (CPS unit)-l 271 includes a title-1 211 and a title-2 212, playback programs 221, 222, and 223, playlists 231 and 232, and clips 241 and 242. At least AV stream data files 261 and 262, which serve as real content data, contained in the two clips 241 and 242, respectively, are data to be encrypted, and are basically encrypted with a title key (Kt1) (also referred to as the "CPS unit key"), which is a cryptographic key associated with the content management unit (CPS unit)-l 271.

The content management unit (CPS unit)-2 272 includes an application-l 213 as an index, a playback program 224, a playlist 233, and a clip 243. An AV stream data file 263, which serve as real content data, contained in the clip 243, is encrypted with a title key (Kt2), which is a cryptographic key associated with the content management unit (CPS unit)-2 272.

To play back an application file or content associated with the content management unit (CPS unit)-1 271, the user needs to obtain the title key (Kt1), which is the cryptographic key set for the content management unit (CPS unit)-1 271, to perform decrypt processing. To play back an application file or content associated with the content management unit (CPS unit)-2 272, the user needs to obtain the title key (Kt2), which is the cryptographic key set for the content management unit (CPS unit)-2 272, to perform decrypt processing.

Figure 3:
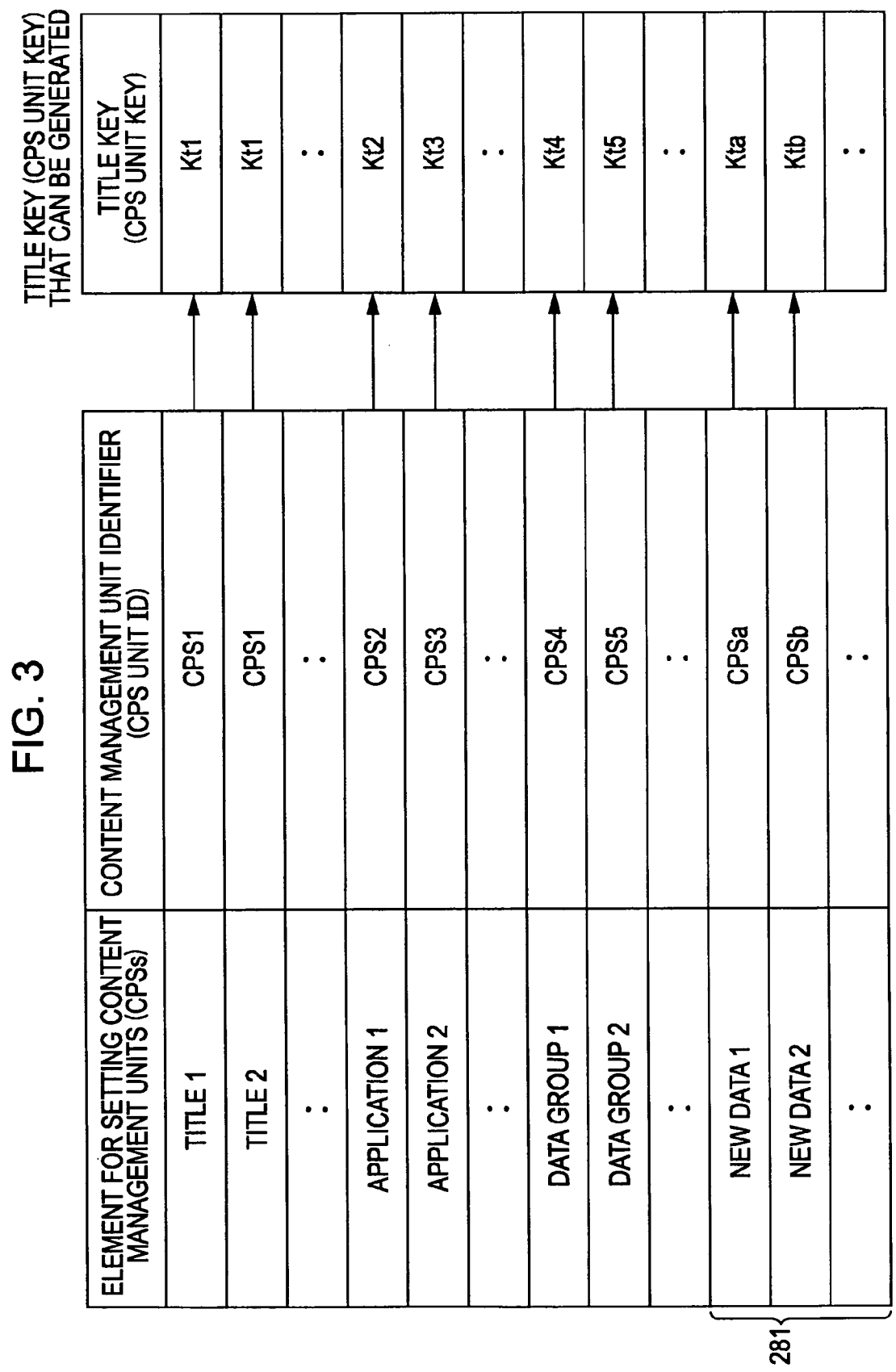
FIG. 3 illustrates the association between content management units set in storage content in an information recording medium and unit keys assigned to the content management units.

An example of the setting of CPS units and the association between the CPS units and the title keys is shown in FIG. 3. More specifically, FIG. 3 illustrates the association between elements for setting the CPS units, which are the management units for using encrypted content stored in an information recording medium, and the title keys (CPS unit keys) used for the CPS units. It is possible to store beforehand CPS units and title keys to be used for data generated or obtained by users afterwards. For example, a data portion 281 is an entry for data generated or obtained by users afterwards.

Various elements can be used for setting CPS units, for example, content titles, applications, data groups, etc. In a CPS unit management table, CPS unit IDs, which serve as identifiers associated with the CPS units, are set.

In FIG. 3, for example, title 1 belongs to CPS unit 1, and to decrypt encrypted content belonging to CPS unit 1, it is necessary to generate title key (Kt) and to decrypt the content by using the generated title key (Kt1).

As discussed above, to individually control for content units, content management units (CPS units) forming the content stored in the information recording medium 100 are encrypted with different keys. To individually control the usage of each CPS unit, usage rules (URs) are set for each CPS unit. As stated above, the usage rules include copy/playback control information (CCI) for content, such as copy restriction information and playback restriction information concerning encrypted content included in each CPS unit.

To generate title keys, data processing using various items of information stored in an information recording medium is necessary. Specific examples of such processing are described in detail below.

3. Overview of Structure of Content Data Including Modified Data and Data Conversion Processing An overview of the structure of content data including modified data and data conversion processing is described below. As stated above, in the encrypted content 101 stored in the information recording medium 100, part of the data forming the encrypted content 101 is replaced by data different from correct data and is set as broken data. With this arrangement, even if the encrypted content 101 including the broken data is decrypted, it is difficult to play back content correctly. To play back content correctly, it is necessary to replace (overwrite) the broken data by conversion data registered in the conversion tables 106.

An overview of the structure of content stored in the information recording medium 100 and playback processing is discussed below with reference to FIG. 4. In the information recording medium 100, AV content, for example, a movie, is stored. The content is encrypted, and can be played back after being decrypted with a cryptographic key that can be obtained only by a playback apparatus with an authorized license. Specific content playback processing is discussed below. In the content stored in the information recording medium 100, part of the data is replaced by modified data.

Figure 4:
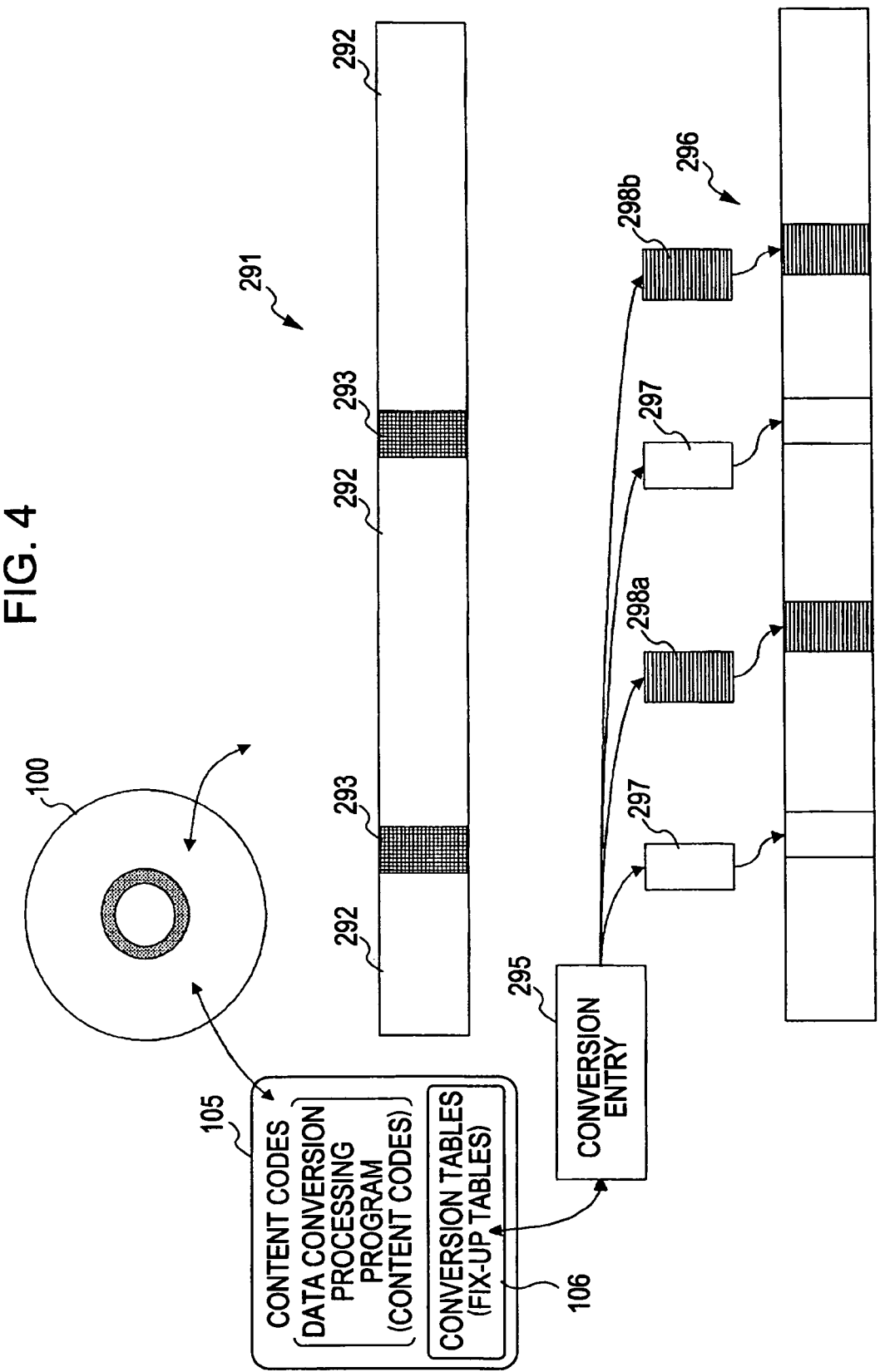
FIG. 4 illustrates content recorded on an information recording medium and data conversion processing necessary for content playback.

FIG. 4 illustrates the structure of content 291 stored in the information recording medium 100. The content 291 includes correct content 292 without being modified and broken data 293, which is modified. The broken data 293 is generated by destroying the original correct content. Accordingly, content playback cannot be correctly performed by using the content 291 including the broken data 293.

To correctly perform content playback, it is necessary to generate playback content 296 by replacing the broken data 293 contained in the content 291 by correct content data. To generate the playback content 296, conversion data, which serves as correct content data to be substituted for the broken data 293 in the corresponding broken data areas, are obtained from conversion entries 295 registered in the conversion tables (fix-up tables) 106 contained in the content codes 105 (see FIG. 1), and the broken data 293 are replaced by the obtained conversion data. Then, the playback content 296 is played back.

When generating the playback content 296, in addition to the replacement of the broken data 293 by conversion data 297, which is correct content data, part of the content 291 is replaced by identifier-setting conversion data 298 for analyzing bits forming identification information (for example, a player ID), which is used for identifying a content player or a content playback application. With this replacement, if illegally copied content is distributed, the distribution source of unauthorized content can be specified by analyzing the identifier-setting conversion data 298 in the distributed content.

The conversion entries 295 are stored in the conversion tables 106, and they may also be dispersedly recorded in specific packets in the data forming the content. That is, multiple recording of the conversion entries 295 in the conversion tables 106 and in the encrypted content 101 shown in FIG. 1 is implemented. An information processing apparatus to play back content performs replacement processing by using either the conversion data stored in the conversion tables 106 or the conversion entries 295 dispersedly recorded in the content.

4. Content Playback Processing

Figure 5:
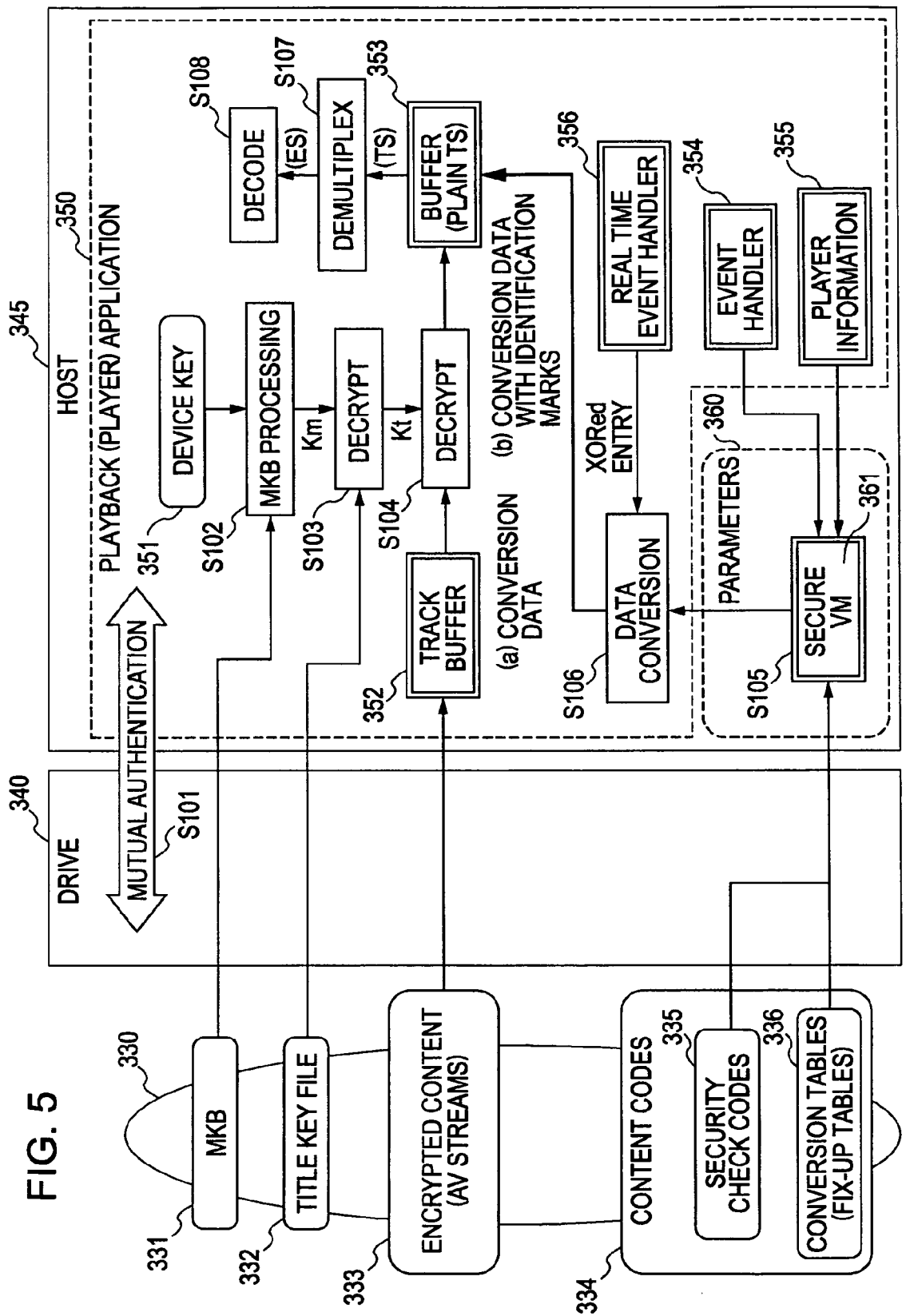
FIG. 5 illustrates an example of content playback processing.

Content playback processing executed by a host 345 is described below with reference to FIG. 5. In FIG. 5, there are shown an information recording medium 330 storing encrypted content therein, a drive 340 that sets the information recording medium 330 and reads data therefrom, and the host 345 connected to the drive 340 so that they can communicate with each other to execute a playback (player) application which obtains content stored in the information recording medium 330 via the drive 340 and plays back content.

In the host 345 shown in FIG. 5, a playback application block 350 that executes content decryption, decoding, and data conversion processing and a secure VM block 360 having a secure VM 361 are separated. The secure VM 361 calculates parameters used for conducting security check based on security check codes 335 contained in content codes 334 recorded on the information recording medium 330 and used for conversion processing based on conversion tables (fix-up tables) 336.

The information recording medium 330 includes an MKB 331, a title key file 332, encrypted content 333, and the content codes 334 as recorded data. In the encrypted content 333, as discussed with reference to FIG. 4, part of data is substituted with broken data, and it is necessary to replace the broken data by data obtained from the conversion tables 336.

The content codes 334 include the security check codes 335 and the conversion tables 336. The security check codes 335 include a program for verifying the integrity of a player (playback apparatus) to perform content playback. The conversion tables 336 store conversion data corresponding to data to be replaced in predetermined areas of the content. The host 345 stores a device key 351 used for MKB processing.

The playback processing sequence performed by the host 345 for obtaining the content stored in the information recording medium 330 via the drive 345 and playing back the content is as follows. Before reading the content from the information recording medium 330, in step S101, the host 345 and the drive 340 conduct mutual authentication to check whether they are an authorized application and apparatus. The mutual authentication can be conducted in various manners. After the mutual authentication has been successfully conducted, the drive 340 and the host 345 share a common session key (Ks), which is a common private key.

Then, in step S102, the playback application 350 of the host 345 obtains the MKB 331 recorded on the information recording medium 330 via the drive 340 and executes processing on the MKB 331 by using the device key 351 stored in a memory to obtain a media key (Km).

The MKB 331 is a cryptographic key block generated based on a tree-structure key distribution system, which is known as one mode of the broadcast encryption method. The MKB 331 is a key information block that makes it possible to obtain the media key (Km), which is a key necessary for decrypting content, only by processing (decryption) by using a device key (Kd) stored in information processing apparatuses having valid licenses.

Then, in step S103, the playback application 350 decrypts the title key file 332 read from the information recording medium 330 by using the media key (Km) obtained in the MKB processing executed in step S102 to obtain a title key (Kt). The title key file 332 stored in the information recording medium 330 is a file including data encrypted with the media key (Km), and by decrypting the title key file 332 by using the media key (Km), the title key (Kt) used for decrypting the content can be obtained. The decryption processing in step S103 can be executed by using, for example, Advanced Encryption Standard (AES) encryption algorithms.

Then, the playback application 350 reads the encrypted content 333 stored in the information recording medium 330 via the drive 340 and stores the read encrypted content 333 in a track buffer 352. Then, in step S104, the playback application 350 decrypts the encrypted content 333 stored in the track buffer 352 by using the title key (Kt) to obtain decrypted content.

The decrypted content is stored in a plaintext transport stream (plain TS) buffer 353. The decrypted content stored in the plain TS buffer 353 contains the above-described broken data, and thus, predetermined data conversion (data replacement by overwriting) is necessary.

In step S105, the secure VM 361 generates parameters necessary for data conversion from the content codes 334. Then, in step S106, table-reconstruction/data-conversion processing is executed under the control of a real time event handler 356. By the control of the real time event handler 356, the playback application 350 outputs a parameter calculation request to the secure VM 361 as an interrupt (INTRP) in response to the switching of content segments. Upon sequentially receiving parameters from the secure VM 361, the playback application 350 decrypts or computes conversion table blocks to obtain plain conversion table blocks and extracts conversion entries contained in the obtained conversion table blocks.

In the conversion entries, (a) conversion data, (b) identifier-setting conversion data, and recording-position specifying information concerning the recording positions of the conversion data in the content are recorded. In step S106, the playback application 350 executes data conversion processing for writing the conversion data and the identifier-setting conversion data into the specified positions in real time, simultaneously with the content playback processing or the output processing.

The secure VM 361 generates different parameters for the individual content segments in accordance with the content codes 334 and outputs the generated parameters. If parameters SP1, SP2, SP3, . . . , are exclusive OR (XOR) computation parameters with the conversion entries corresponding to the content segments, the following exclusive computation operations are executed as the table reconstruction processing in step S106:

[Conversion entry 1] (XOR) [SP1]
[Conversion entry 2] (XOR) [SP2]
[Conversion entry 3] (XOR) [SP3], and so on.

Then, the conversion entries contained in the conversion table block data are obtained. In the above computation operations, [A] (XOR) [B] means exclusive OR (XOR) computation between A and B.

In this manner, the conversion entries included in the content 333 recorded on the information recording medium 330 have been subjected to exclusive OR (XOR) computation with the parameters SP1, SP2, SP3, and so on. Those parameters SP1, SP2, SP3, and so on, are obtained and output by the secure VM 361.

In the table-reconstruction/data-conversion processing in step S106, conversion data is obtained from the conversion entries reconstructed by the computation or encryption using the parameters SP1, SP2, SP3, and so on, and the broken data included in the content is replaced by the obtained conversion data, which is correct content data. Additionally, part of the data is also replaced by the identifier-setting conversion data. Then, the data stored in the plain TS buffer 353 is changed to converted data. An overview of this data conversion processing is discussed below with reference to FIG. 6.

The encrypted content 333 stored in the information recording medium 330 is temporarily stored in the track buffer 352 of the host 350. The encrypted content 333 stored in the track buffer 352 corresponds to track buffer storage data 401 indicated by (1) in FIG. 6. The track buffer storage data 401 is decrypted into decrypted data 402, indicated by (2) in FIG. 6, by the host 350, and is stored in the plain TS buffer 353.

The decrypted data 402 contains broken data 403, which is not correct content data. The data conversion processor of the host 350 thus replaces the broken data 403 by conversion data 404, which is the correct content data. This replacement processing is executed by rewriting (overwriting) part of the data 402 stored in the plain TS buffer 353.

Figure 6:
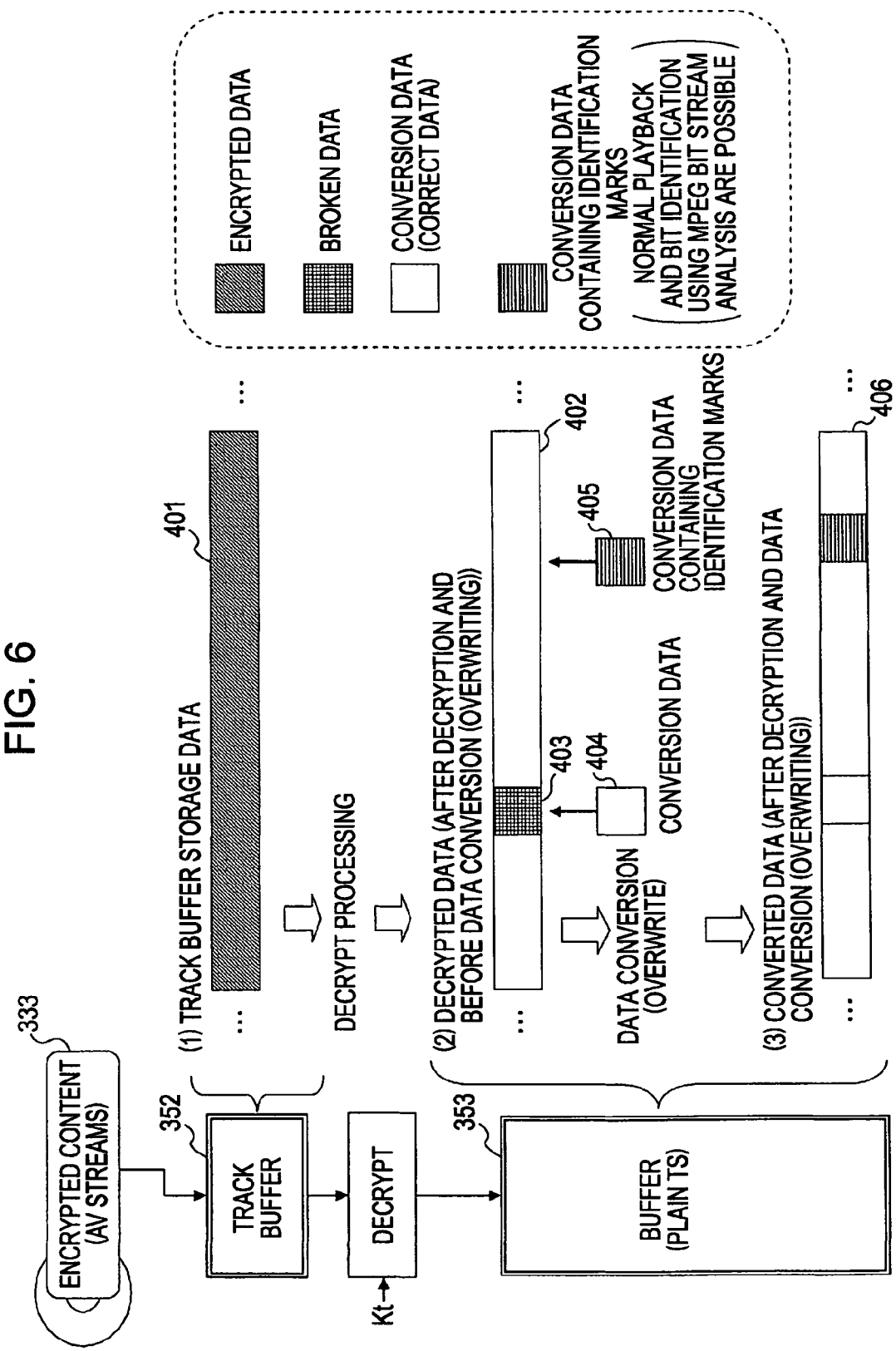
FIG. 6 illustrates data conversion processing executed when content is played back.

In addition to the replacement processing for replacing the broken data 403 by the conversion data 404, which is the correct content data, the host 350 replaces, as shown in FIG. 6, part of the decrypted data 402 by identifier-setting conversion data 405.

As stated above, the identifiers are data that can analyze bits forming the identification information for identifying a content playback apparatus or a content playback application. More specifically, the identifiers are identification information (player ID) concerning an information processing apparatus, which is a player executing a host application, or identification marks generated based on the player ID. The identifier-setting conversion data 405 is generated by slightly modifying the bits forming the correct content data to such a degree as not to influence playback of the content.

A plurality of the identifier-setting conversion data 405 are set in the content, and by collectively analyzing the identifier-setting conversion data 405, the player ID, for example, can be identified. The identifier-setting conversion data 405 is data that can identify bits forming identification marks by MPEG bit stream analysis.

In the conversion tables 336 stored in the information recording medium 330, many conversion data 404 and identifier-setting conversion data 405 shown in FIG. 6 are registered, and also, information concerning the recording positions of the conversion data 404 and the identifier-setting conversion data 405 is registered. By executing the data conversion processing based on the information stored in the conversion tables 336, the data stored in the plain TS buffer 353 is replaced by converted data 406 indicated by (3) in FIG. 6.

Then, the converted TSs are output to an external source via a network, and are played back by an external playback apparatus. Alternatively, in step S107, the TSs are converted into elementary streams (ESs) by a demultiplexer, and in step S108, the ESs are decoded. The decoded ESs are played back by a display speaker.

5. Processing Using Security Check Codes

Before starting the above-described content playback processing, the secure VM 361 conducts security check by using the security check codes 335 contained in the content codes 334. If necessary, the secure VM 361 continues security check while content is being played back.

The secure VM 361 verifies the integrity of a player (playback apparatus) in accordance with the security check codes 335 contained in the content codes 334 under the control of an event handler 354. As stated above, the conversion tables 336 and the security check codes 335 contain various types of codes to allow the execution of processing in accordance with the types of players and player port information.

The secure VM 361 obtains information concerning the player (player information 355), such as a player certificate stored in the storage unit of the player and information concerning ports of the player, and selects the security check code corresponding to the player from the security check codes 335 to conduct security check. That is, the secure VM 361 obtains, as the player information, at least one of the identification information and the attribute information corresponding to an information processing apparatus or a content usage application, and selects the security check code corresponding to the player information to execute security check based on the selected code.

As discussed above, when using content stored in an information recording medium, the secure VM 361 conducts security check. After the integrity of the player is verified as a result of the security check and after the denial of unauthorized output of content is ensured based on, for example, the player information 355, the content is played back. If the configuration of the player is changed, for example, if a new device is connected to a port of the player, security check may be conducted in accordance with the changed configuration of the player.

Different types of security check may be necessary in accordance with the configurations of playback apparatuses or the types of playback applications. Accordingly, the security check codes 335 are recorded in the content codes 334 as a set of codes corresponding to various players and applications.

Figure 7:
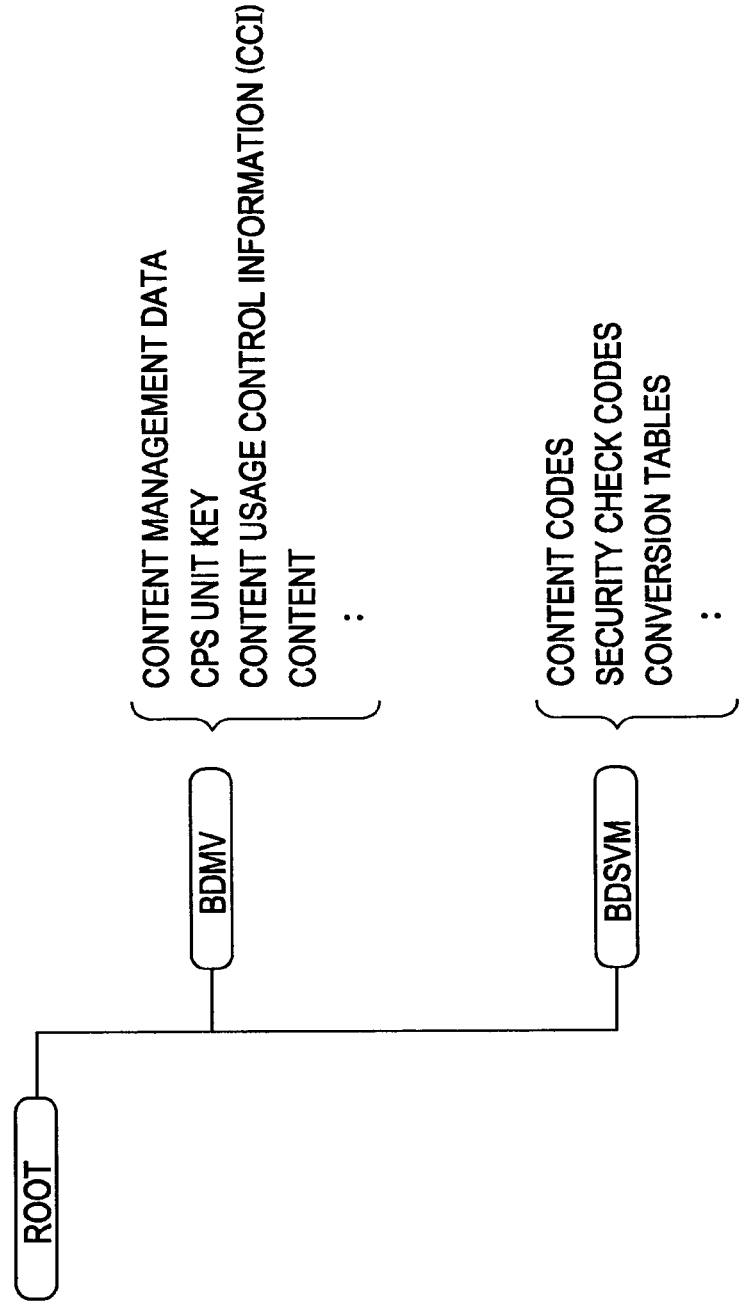
FIG. 7 illustrates the directory structure of data to be recorded on an information recording medium.

The structure of content codes recorded in an information recording medium is discussed below with reference to FIGS. 7 through 9. FIG. 7 illustrates the directory structure of the overall data stored in an information recording medium. The storage data in an information recording medium is largely divided into two data: one is a BDMV directory including content-related data, such as content management data, CPS unit key, content usage control information (CCI), and content, and the other is a BDSVM directory including content codes, such as security check codes and conversion tables.

Figure 8:
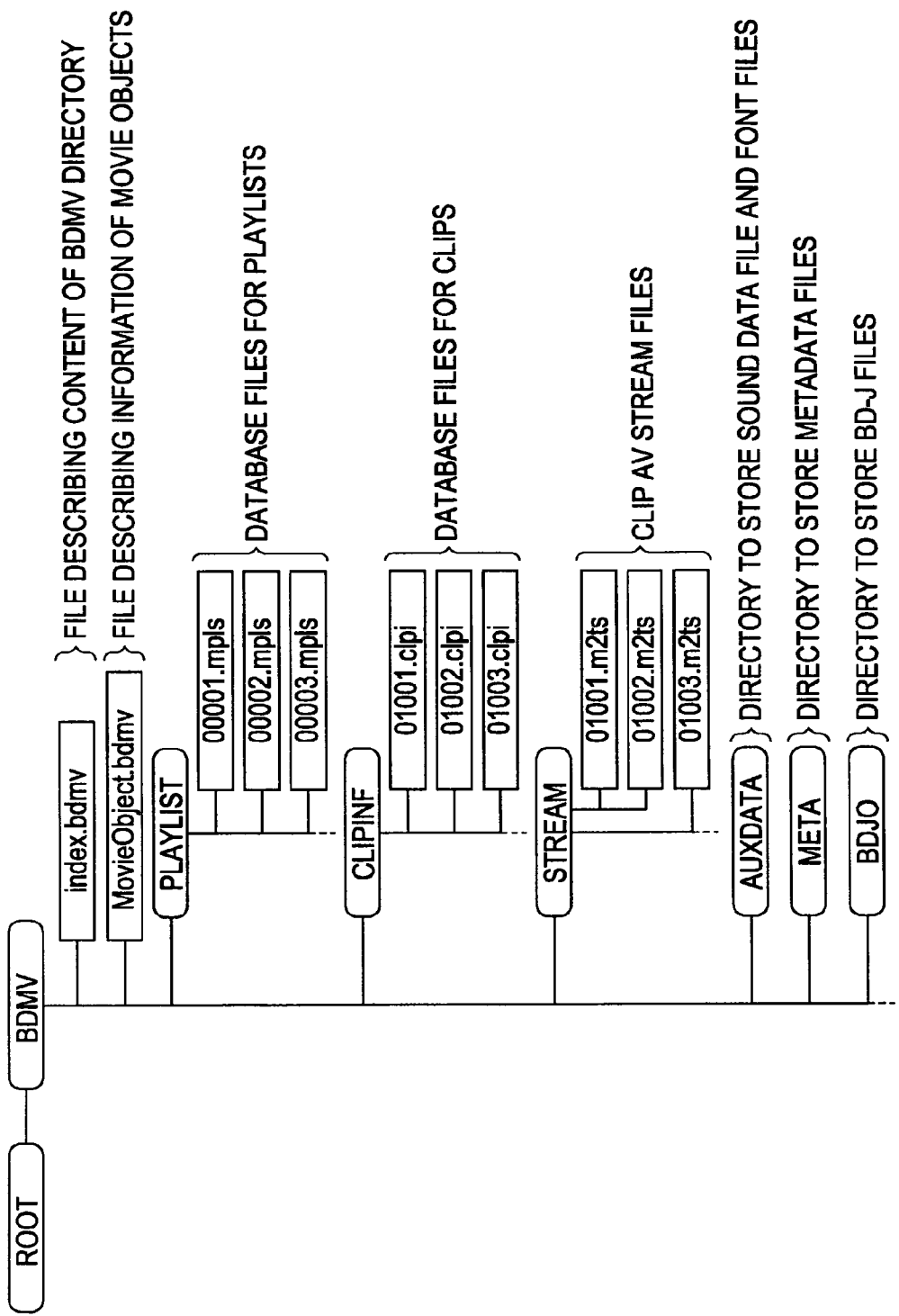
FIG. 8 illustrates the directory structure of content and management data to be recorded on an information recording medium.

Details of the BDMV directory and the BDSVM directory are discussed below with reference to FIGS. 8 and 9, respectively. When storing content having a hierarchical structure discussed with reference to FIG. 2 in an information recording medium, various data and programs, such as content codes, are recorded as individual files in the information recording medium in accordance with, for example, the directory structure shown in FIG. 8. The files stored in the information recording medium are, for example, as follows:

(A) index.bdmv file corresponding to the index layer 210 shown in FIG. 2;

(B) Movieobject.bdmv file corresponding to the movie object layer 220 shown in FIG. 2;

(C) files under a PLAYLIST directory corresponding to the playlist layer 230 shown in FIG. 2;

(D) files under a CLIPINF directory and files under a STREAM directory corresponding to the clip layer 240 shown in FIG. 2, the files under the CLIPINF directory and the STREAM directory shown in FIG. 8 being associated with the clips and the streams shown in FIG. 2 according to the same file numbers; and (E) other files, such as an AUXDATA File storing sound data and font data, a META file storing metadata, and a BDJO file storing BD-J objects.

In content stored in an information recording medium, as stated above, part of the data is replaced by broken data, which is different from correct content data. To correctly play back the content, it is necessary to replace the broken data by data (converted data) registered in a conversion table. In this replacement processing, the broken data is converted into the data registered in the conversion tables (fix-up table) by using the content codes stored in the information recording medium.

The content codes including the conversion tables and the security check codes are also stored in the information recording medium as individual files. The directory structure including the content codes is shown in FIG. 9. The directory structure shown in FIG. 9 is the structure including the content codes created for AV content having the directory structure shown in FIG. 8.

As stated above, the content codes include security check codes and conversion tables. The content codes in an information recording medium are stored, as shown in FIG. 9, in a plurality of individual files nnnnn.svm set in the BDSVM directory. Backup data is also set in a BACKUP directory as copy data.

The files storing the content codes are classified into the following categories:

(a) content codes common to all items of content and all players (playback apparatuses or playback applications);

(b) content codes unique to content;

(c) content codes unique to players (playback apparatuses or playback applications); and (d) content codes unique to content and players (playback apparatuses or playback applications).

By classifying the content codes into the categories (a) through (d), the content codes can be set as independent data files, and thus, the data files can be reused. That is, some content code files can be reused in common for different items of content and different players (playback apparatuses or playback applications). The reuse of content codes is discussed below with reference to FIG. 10.

Figure 10:
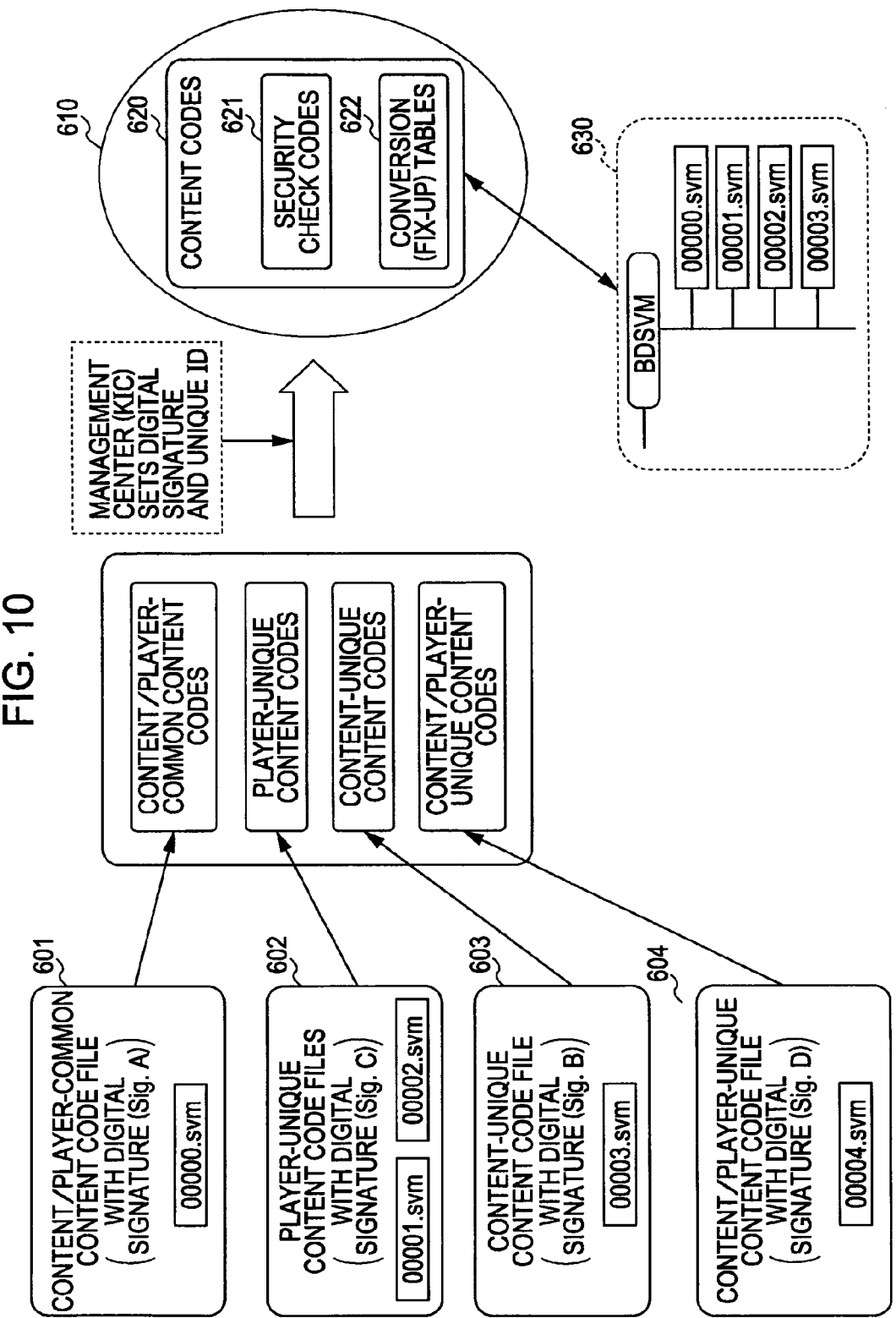
FIG. 10 illustrates details of a generation/recording process of content codes to be recorded on an information recording medium.

In FIG. 10, content code files 601 through 604 are files kept by content code production or providing entities. The content code files 601 through 604 are a content/player-common content code file 00000.svm 601, player-unique content code files 00001.svm and 00002.svm 602, a content-unique content code file 00003.svm 603, and a content/player-unique content code file 00004.svm 604, respectively.

After attaching digital signatures of the content code production or providing entities to the content code files 601 through 604, they are kept in the content code production entities or providing entities.

When producing an information recording medium storing new content, each entity can reuse the content code files 601 through 604 that have already been used for another content. If, for example, a content-unique content code file and a player-unique content code file are set as the same file, and in this case, if content is changed, the content-unique content code file has to be changed. This means that the content code file common to the content-unique content code file and the player-unique content code file is changed even if it is not necessary to change the player-unique content code. Accordingly, since a digital signature is attached to the content code file, it should also be changed, which hampers the reuse of the payer-unique content code file. In contrast, if the content code files are individually created according to the categories, as shown in FIG. 10, the player-unique content code files, for example, can be reused when another disk is manufactured.

To prevent tampering of the content codes, each content code file is provided to a management center (KIC), and is provided with a digital signature and is stored in an information recording medium 610. The management center attaches digital signatures and unique IDs to content codes to be recorded in the information recording medium 610. Content codes 620 recorded on the information recording medium 610 include, as shown in FIG. 10, security check codes 621 and conversion tables (fix-up tables) 622. In the specific directory structure, content codes generated by individual entities are set, as indicated by a directory structure 630 shown in FIG. 10.

In this manner, content codes can be reused for various items of content, and content codes that can be reused and content codes that should be changed are suitably combined, and are recorded in an information recording medium.

Figure 9:
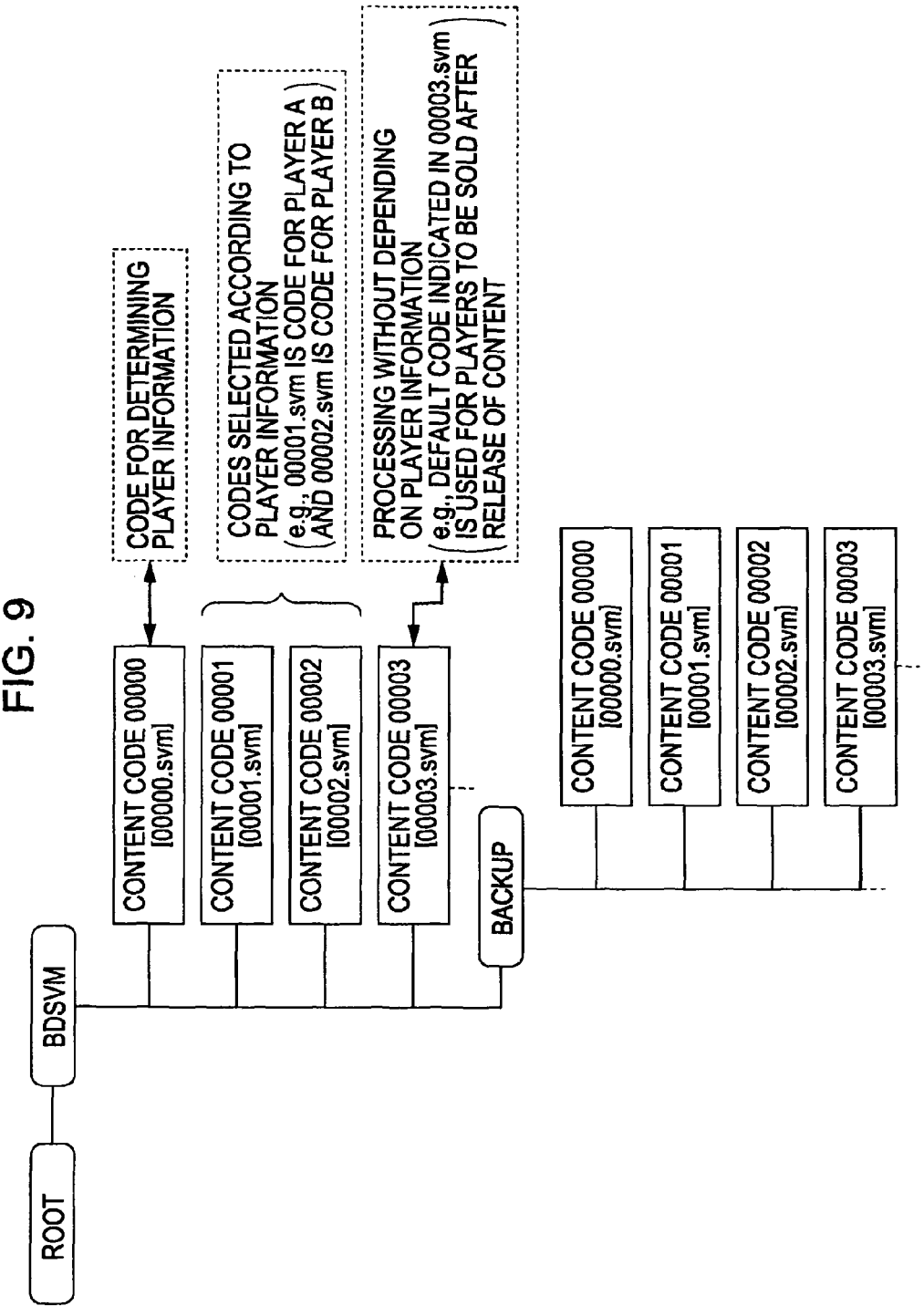
FIG. 9 illustrates the directory structure of content codes to be recorded on an information recording medium.

The content code files may be set, as shown in FIG. 9, according to the following categories:

content code file 00000.svm: code for determining player information;

content code file 00001.svm and 00002.svm: codes selected according to player information (e.g., 00001.svm is code for player A and 00002.svm is code for player B); and content code file 00003.svm: code that does not depend on player information (e.g., default code indicated in 00003.svm is used for players to be sold after the content is released).

As discussed above, different content codes classified into various categories are stored in an information recording medium, and a player (playback apparatus) to conduct security check using content codes selects the security check code associated with the player.

The secure VM 361 shown in FIG. 5 selects the security check code corresponding to the player associated with the secure VM 361 to conduct security check. In this case, the secure VM 361 obtains the player information 355 to conduct security check by using the security check code.

The player information 355 includes a player certificate stored in the memory of the player and information concerning the ports of the player. The player information 355 include various types of information, such as information that can be directly obtained by the secure VM 361 from the memory, information that can be obtained via a playback application, and information that can be obtained via an operating system (OS).

For example, information, such as a player certificate, can be obtained via a playback application. However, information concerning players, such as the number of ports provided for a player, or information concerning a device connected to a port, is not necessarily obtained directly by a playback application, and can be obtained only via another program, such as an OS. The secure VM 361 obtains information directly or via a playback application or another program to conduct security check.

One type of security check executed by the secure VM 361 is to check whether a playback apparatus has an authorized player certificate. The player certificate certifies the usage right of content and is issued by a management entity that manages the content.

An example of the configuration of the player certificate is shown in FIG. 11. The player certificate includes, as shown in FIG. 11, data indicating a player certificate size, a certificate version, a player manufacturer ID, a serial number, a signature time and date, a device (player) attribute information, a player public key, and a digital signature. Data other than the above-described data, such as that concerning a player model name and a player model version, may be included.

The secure VM 361 verifies the player certificate in accordance with the security check codes 335 read from the information recording medium 330, and after the integrity of the player certificate is verified, the secure VM 361 can obtain information necessary for further security check from this certificate. More specifically, the security VM 361 first checks the integrity of the signature attached to the player certificate by using, for example, a public key of the management center, which is the entity that has attached the signature to the player certificate. The public key of the management center may be stored beforehand in the memory of the playback apparatus or may be obtained from the information recording medium 330 directly or via a network.

If the integrity of the player certificate is not verified, processing to perform content playback accompanying data conversion is discontinued. If the integrity of the player certificate is verified, security check is conducted for the player. Basic player information, such as a manufacturer, can be obtained from the player certificate.

That is, the secure VM 361 checks the integrity of the player certificate, and under the condition that the integrity of the player certificate is verified, the secure VM 361 obtains identification information or attribute information corresponding to the information processing apparatus or the content usage application, such as the manufacturer, type, version, and serial number of the apparatus or the application, from the information recorded on the player certificate. Based on the obtained information, the secure VM 361 selects the security check code corresponding to the obtained information to conduct security check based on the selected code. The player information, such as information necessary for security check, is obtained by the playback application 350 or the secure VM 361.

Player information (player configuration information) other than a player certificate is described below with reference to FIG. 12. Player information used for conducting security check includes, as shown in FIG. 12, the following information:

port attributes: one-way, two-way, analog, digital, video, audio, recordable/not-recordable;

port statuses: format of data output via a port (composite video, component video, digital audio, and digital video) and protocol information (VGA/HDCP/DTCP); and player information: RAM size, system clock, and data conversion (media transform) processing method for the virtual machine (VM).

When checking for the possibility of the unauthorized use of content, the secure VM 361 may need to check whether unauthorized output or copying of content using a specific port has been conducted. In this case, the secure VM 361 refers to port attributes and port statuses obtained as the player information 355, and selects a suitable security check code corresponding to the player information 355 to check the unauthorized use of content. The selection and application of a suitable security check code by using the player information 355 implements efficient and effective security check using content codes. That is, a certain execution time is necessary for executing content codes. Accordingly, by executing a necessary security check code selected from a plurality of security check codes stored in a disk, security check can be conducted speedily without decreasing the security level. The execution speed of security check codes can be ensured as follows. A player is first specified, and a security check code is selected based on the performance of the specified player so that a player having higher performance is allowed to execute more security check codes than a player having lower performance. With this arrangement, the user does not have to wait while the security check codes are being executed. More specifically, the time used for executing security check codes is first determined, and then, security check codes are generated and selected so that the execution of the security check codes can be finished within the given time.

The player information 355 is obtained by the playback application 350 or the secure VM 361 via various routes. The necessary player information 355 is obtained, and the secure VM 361 executes the security check codes 355 by using the player information 355 to conduct security check.

Processing for obtaining player information is discussed below with reference to FIG. 13. FIG. 13 illustrates layers forming a playback apparatus, for example, a PC or a playback-only device (consumer electronics (CE) apparatus), which executes content playback. In FIG. 13, there are shown a process execution application, such as a playback application 701 that executes content playback, which is the highest layer, an OS 711 under the playback application 701, and a hardware/device driver 721 including various hardware and device drivers, under the OS 711.

A secure VM 702, which is generated by the playback application 701 as a virtual machine, conducts security check using security check codes. The secure VM 702 conducts security check by obtaining various player information. For example, the player certificate shown in FIG. 11 is stored in the memory of the playback apparatus, and is contained in player information 703 that can be directly obtained by the playback application 701. Other information, such as device/application-dependent information, e.g., the number of ports of a CE device, is also contained in the player information 703.

In contrast, information concerning various devices connected to the ports of the playback apparatus is not contained in the player information 703 that can be directly obtained by the playback application 701. Such information includes device information concerning the hardware/device-driver 721, and is contained in player information 713 that can be obtained by the OS 711.

The playback application 701 obtains the player information 713 from the OS 711 and provides it to the secure VM 702 that executes security check.

The player information 713 that can be obtained by the playback application 701 from the OS 711 includes information that may be changed by, for example, the extension of the system or the connection of an external device. Such information can be obtained from a device manager 712 of the OS 711 while the playback application 701 is being executed, and includes information concerning, for example, platforms and ports.

It is now assumed that, when the playback application 701 is started, it checks the condition of the apparatus, and then performs content playback in accordance with the configuration of the apparatus. In this case, the playback application 701 obtains information concerning the condition of the apparatus and provides the information to the secure VM 702. If the playback application 701 has the function of obtaining the latest information concerning, for example, a new device connected to the apparatus after the playback application 701 is started, it provides the updated information to the secure VM 702 if necessary.

There is some device information, such as that indicated by C2 in FIG. 13, which cannot be obtained by the playback application 701 from the OS 711. For example,. it is difficult for a general playback application to obtain the register value stored in a device driver unless it executes special processing with the aid of the device driver and the OS 711.

Basically, the playback application 701 does not obtain such information, and conducts security check by using only available player information, such as a player certificate and apparatus information.

A description is now given, with reference to the flowchart in FIG. 14, of a content playback sequence including security check processing using security check codes included in content codes and conversion processing using conversion tables.

In step S301, the secure VM obtains content codes from an information recording medium and determines whether a request to obtain player information is included in the content codes. For example, the secure VM reads the content code file 00000.svm that stores a code for determining player information in the directory structure shown in FIG. 9.

If it is determined in step S301 that the request to obtain player information is not included in the content codes, the process proceeds to step S306. If the request to obtain player information is included in the content codes, the process proceeds to step S302 to obtain player information necessary for security check. The player information includes, for example, a player certificate, such as that shown in FIG. 11, and port attributes, port statuses, and other player information, such as those shown in FIG. 12. As discussed with reference to FIG. 13, an apparatus having expansion functions, such as a PC, obtains player information from the device management function of an OS, to acquire port attributes. A CE device obtains fixed values as player information since port attributes for the CE device are fixed. In this manner, necessary player information is different depending on the type of apparatus, and also, player information is obtained in different manners.

In step S303, it is determined whether a security check code corresponding to the obtained player information is included in the content codes. If it is determined in step S303 that the security check code is included, the process proceeds to step S304 to conduct security check corresponding to the security check code. Security check is conducted by using, for example, the content code file 00001.svm or 00002.svm, shown in FIG. 9, which is selected according to the player information.

It is then determined in step S305 as a result of security check whether there is any problem. If a problem is found, processing to perform content playback is terminated. If there is no problem as a result of security check, the process proceeds to step S306 to determine whether data conversion processing using a conversion table contained in the content codes is necessary. If data conversion processing is not necessary, the process proceeds to step S308 to perform content playback.

If it is determined in step S306 that data conversion processing is necessary, the process proceeds to step S307 to obtain a conversion table and to decrypt it to perform content conversion processing by using information recorded in the conversion table. This conversion processing corresponds to the processing discussed with reference to FIG. 6. Then, in step S307, content is played back. It should be noted that data conversion processing in step S307 and content playback processing in step S308 are simultaneously performed.

6. Configuration of Information Processing Apparatus

A description is now given, with reference to FIG. 15, of the hardware configuration of an information processing apparatus (host) 800 that executes data processing using the above-described playback (player) application and secure VM. The information processing apparatus 800 includes a central processing unit (CPU) 809, a ROM 808, which serves as a storage area storing programs and parameters therein, a memory 810, a digital input/output interface (I/F) 802 that inputs and outputs digital signals, an analog input/output I/F 804 that inputs and outputs analog signals and includes analog-to-digital (A/D) and digital-to-analog (D/A) converters 805, an MPEG codec 803 that encodes and decodes MPEG data, a transport-stream (TS)/program-stream (PS) processor 806 that performs TS/PS processing, an encryption unit 807 that performs mutual authentication and various types of encryption processing, such as decryption of encrypted content, a recording medium 812, such as a hard disk, and a drive 811 that drives the recording medium 812 and inputs and outputs data recording/playback signals. The above-described elements are connected to a bus 801. The CPU 809 performs data processing in accordance with various programs including various types of processing that accompany processing performed by an OS or a content playback/recording application program, mutual authentication processing, and content playback, for example, security check processing based on security check codes and data conversion processing using conversion tables.

The information processing apparatus 800 is connected to the drive 811 via a connection bus, such as an advanced technology attachment packet interface (ATAPI)-BUS bus. Conversion tables and content are input or output via the digital input/output I/F 802. The encryption processor 807 performs encryption processing and decryption processing by using, for example, AES algorithms.

The program for executing content playback/recording processing is stored in, for example, the ROM 808, and the memory 810 is used as a work area or for storing parameters and data while the program is being executed.

In the ROM 808 or the recording medium 812, the above-described player certificate, a public key of a management center which is used for verifying the signature of the player certificate, a host private key and a host public key for conducting authentication with the drive 811, and a revocation list of revoked public key certificates are stored.

To play back content or to output content to an external source, by using a data conversion processing program obtained from the information recording medium 812, decryption of encrypted content, reconstruction of conversion tables, and overwriting of conversion data based on the data stored in the conversion tables are performed in accordance with the above-described processing sequence.

7. Information Recording Medium Manufacturing Apparatus and Information Recording Medium An information recording medium and an information recording medium manufacturing apparatus, and more specifically, an information recording medium used in the above-described content playback processing and a manufacturing apparatus and method for such an information recording medium, are discussed below.

The information recording medium manufacturing apparatus is an apparatus for manufacturing, for example, the information recording medium 100 storing the recorded data described with reference to FIG. 1. The information recording medium manufacturing apparatus includes, as shown in FIG. 16, a content file generator 901 that generates content files storing content data to be recorded on an information recording medium 910, a content code file generator 902 that generates content code files storing content codes including a security check processing program to be executed for using content, and a recorder 903 that records the content files generated by the content file generator 901 and the content code files generated by the content code file generator 902 on the information recording medium 910.

The content code file generator 902 generates, as discussed with reference to FIG. 9, a plurality of content code files in accordance with various types of information processing apparatuses and content usage applications.

The content code file generator 902 also generates content code files storing common content codes that do not depend on the type of information processing apparatus or content usage application, content code files storing content codes depending on the type of information processing apparatus or content usage application, and content code files storing codes for determining the types of information processing apparatuses or content usage applications. The recorder 903 records those various content code files on the information recording medium 910.

When generating a plurality of content code files storing content codes classified into different categories, the content code file generator 902 generates files, all of which are provided with digital signatures, or files, only one of which is provided with a digital signature. The digital signatures attached to the files generated by the content code file generator 902 may be only digital signatures of a management center (KIC) or digital signatures of a management center and digital signatures of content code production or providing entities.

On the information recording medium 910 generated by the information recording medium manufacturing apparatus, various data discussed above are recorded. More specifically, at least content files storing content data and content code files storing content codes including a security check processing program to be executed for using content are recorded. The content code files include a plurality of content code files associated with the types of information processing apparatuses or content usage applications.

Content code files recorded on the information recording medium 910 may be classified, as discussed with reference to FIG. 9, into code files storing common content codes that do not depend on the type of information processing apparatus or content usage application, code files storing content codes depending on the type of information processing apparatus or content usage application, and code files storing codes for determining the types of information processing apparatuses or content usage applications.

The content code files to be recorded on an information recording medium include a plurality of content code files storing content codes classified into different categories. Among the plurality of recorded files, only one file may be provided with a digital signature, or all the files may be provided with digital signatures. Digital signatures of content code production or providing entities may be attached to the content code files.

A series of processing operations described in the specification may be executed by hardware, software, or a combination thereof. If software is used, a program storing processing sequences therein may be installed into a memory of a computer built in dedicated hardware or into a general-purpose computer that can execute various types of processing, and is then executed.

The program may be stored beforehand in a hard disk or a ROM, which serves as a recording medium. Alternatively, the program may be temporarily or permanently stored (recorded) in a removable recording medium, such as a flexible disk, a compact disc read only memory (CD-ROM), a magneto-optical disk (MO disk), a digital versatile disc (DVD), a magnetic disk, or a semiconductor memory. Such a removable recording medium can be provided as so-called "package software".

As stated above, the program may be installed into a computer from the above-described removable recording medium. Alternatively, the program may be transferred from a download site to a computer wirelessly or by wired means via a network, such as a local area network (LAN) or the Internet. In this case, the computer receives the program and installs it into a built-in recording medium, such as a hard disk.

Various processing operations described in the specification may be executed in chronological order discussed in the specification. Alternatively, they may be executed in parallel or individually in accordance with the performance of an apparatus executing the processing or according to the necessity. In this specification, the system is a logical set of a plurality of devices, and it is not essential that the devices be in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that performs playback processing for content recorded on an information recording medium, comprising:
    a data processor that, when using the content recorded on the information recording medium comprising the content and content codes that comprise security check codes to conduct a security check for the information processing apparatus:
        in response to a determination by the data processor of the information processing apparatus that the content codes include a request to obtain, from memory of the information processing apparatus, identification information related to a player certificate or a port status of the information processing apparatus, obtains from the memory of the information processing apparatus the identification information comprising certificate information of the information processing apparatus or configuration information comprising the port status of the information processing apparatus; and
        determines, based on the request, whether the security check codes classified into a plurality of data files comprise a security check code corresponding to the identification information to conduct a security check on the basis of the security check code.

2. The information processing apparatus according to claim 1, wherein the data processor obtains the player certificate stored in a storage unit of the information processing apparatus and verifies an integrity of the player certificate, and if the integrity of the player certificate is verified, the data processor obtains the identification information from information recorded on the player certificate.

3. The information processing apparatus according to claim 1, wherein the configuration information further comprises at least one of port attribute information, memory area size information, and data processing mode information concerning the information processing apparatus, and wherein the information processing apparatus conducts security check corresponding to the obtained configuration information.

4. The information processing apparatus according to claim 1, wherein, when obtaining the configuration information, the data processor obtains device information managed by an operating system and conducts security check corresponding to the obtained device information.

5. The information processing apparatus according to claim 1, wherein, when the configuration information is updated, the data processor obtains the updated configuration information and conducts security check corresponding to the updated configuration information.

6. The information processing apparatus according to claim 1, wherein the data processor performs data processing which accompanies content data replacement processing using a conversion table included in the content codes, the data processing being performed in accordance with the security check code corresponding to the information obtained based on the identification information.

7. An information recording medium manufacturing apparatus comprising:
   content file obtaining means for obtaining content files storing content to be recorded on an information recording medium;
   content code file obtaining means for obtaining content code files storing a plurality of content codes comprising security check codes and a security check processing program that executes the security check codes when the content is used; and
   recording means for recording the content files obtained by the content file obtaining means and the content code files obtained by the content code file obtaining means on the information recording medium,
   wherein the content code file obtaining means obtains a plurality of content code files comprising:
      at least one first content code file that stores first content codes from the plurality of content codes that do not depend on types of information processing apparatuses or content usage applications and do not depend on the content,
      at least one second content code file that stores second content codes from the plurality of content codes that depend on the types of information processing apparatuses or content usage applications, and
      at least one third content file that stores third content codes from the plurality of content codes for determining the types of information processing apparatuses or content usage applications, and wherein the type of the information processing apparatuses comprises manufacturers of the information processing apparatuses.

8. The information recording medium manufacturing apparatus according to claim 7, wherein the content code file obtaining means obtains a code file storing a code for determining the type of an information processing apparatus or content usage application.

9. An information recording medium comprising:
   content files storing content; and
   content code files storing a plurality of content codes each including a security check processing program to be executed when the content is used by an information processing apparatus,
   wherein the content code files comprise a plurality of content code files comprising:
      at least one first content code file that stores first content codes from the plurality of content codes that do not depend on a type of the information processing apparatus or a content usage application and do not depend on the content,
      at least one second content code file that stores second content codes from the plurality of content codes that depend on the type of the information processing apparatus and port information on the information processing apparatus, and
      at least one third content file that stores third content codes from the plurality of content codes for determining the type of the information processing apparatus or the content usage application.

10. The information recording medium according to claim 9, wherein the content code files include a code file storing a code for determining a type of an information processing apparatus or a content usage application.

11. An information processing method for use in an information processing apparatus and for performing data processing using data comprising content and content codes recorded on an information recording medium, the method comprising:
   with at least one processor, performing the data processing by:
      in response to a determination that the content codes recorded on the information recording medium include a request to obtain from memory of the information processing apparatus identification information related to a player certificate or a port status of the information processing apparatus, obtaining the identification information;
      selecting, from security check codes included in the content codes, a security check code corresponding to the identification information comprising certificate information of the information processing apparatus and configuration information that comprises a port status of the information processing apparatus; and
      when using the content recorded on the information recording medium, conducting a security check for the information processing apparatus in accordance with the selected security check code.

12. The information processing method according to claim 11, wherein, in the execution of the data processing,
   the player certificate stored in a storage unit of the information processing apparatus is obtained and an integrity of the player certificate is verified, and
   when the integrity of the player certificate is verified, the identification information is obtained from information recorded on the player certificate.

13. The information processing method according to claim 11, wherein, in the execution of the data processing, at least one of port attribute information, memory area size information, and data processing mode information concerning the information processing apparatus is obtained as the configuration information, and security check corresponding to the obtained configuration information is conducted.

14. The information processing method according to claim 11, wherein, in the execution of the data processing, device information managed by an operating system is obtained when obtaining the configuration information, and security check corresponding to the obtained device information is conducted.

15. The information processing method according to claim 11, wherein, in the execution of the data processing, when the configuration information is updated, the updated configuration information is obtained, and security check corresponding to the updated configuration information is conducted.

16. The information processing method according to claim 11, wherein, in the execution of the data processing, data processing which accompanies content data replacement processing using a conversion table included in the content codes is performed, the data processing being performed in accordance with the security check code corresponding to the information obtained based on the identification information.

17. An information recording medium manufacturing method for use in an information recording medium manufacturing apparatus, comprising:
  obtaining content files storing content to be recorded on an information recording medium;
  obtaining content code files storing a plurality of content codes comprising a security check processing program to be executed when the content is used by an information processing apparatus or a content usage application, the content code files comprising:
    at least one first content code file that stores first content codes from the plurality of content codes that do not depend on a type of the information processing apparatus or the content usage application and do not depend on the content,
    at least one second content code file that stores second content codes from the plurality of content codes that depend on the type and a port status of the information processing apparatus or the content usage application, and
    at least one third content file that stores third content codes from the plurality of content codes for determining the type of the information processing apparatus or the content usage application; and
  recording the obtained content files and the obtained content code files on the information recording medium.

18. The information recording medium manufacturing method according to claim 17, wherein, in the execution of obtaining the content code files, a code file storing a code for determining the type of the information processing apparatus or the content usage application is obtained.

19. An information recording medium manufacturing apparatus comprising:
  a content file obtaining unit configured to obtain content files storing content to be recorded on an information recording medium;
  a content code file obtaining unit configured to obtain content code files storing a plurality of content codes comprising a security check processing program to be executed when the content is used by an information processing apparatus or a content usage application, the content code files comprising:
    at least one first content code file that stores first content codes from the plurality of content codes that do not depend on a type of the information processing apparatus or the content usage application and do not depend on the content,
    at least one second content code file that stores second content codes from the plurality of content codes that depend on the type of the information processing apparatus or the content usage application, and
    at least one third content file that stores third content codes from the plurality of content codes for determining the type of the information processing apparatus or the content usage application; and
  a recorder configured to record the content files obtained by the content file obtaining unit and the content code files obtained by the content code file obtaining unit on the information recording medium.

20. The information processing apparatus according to claim 1, wherein the data processor, in response to a determination that the content codes do not include the request, causes playback of the content.

21. The information processing apparatus according to claim 1, wherein the data processor performs the determination that the content codes include the request, the determination comprising obtaining from at least one content code file storing at least one content code from the content codes a code for determining the identification information.

22. The information processing method according to claim 11, further comprising, in response to a determination that the content codes do not include the request, causing playback of the content.

* * * * *